United States Patent
Scholz

(10) Patent No.: US 9,544,208 B2
(45) Date of Patent: Jan. 10, 2017

(54) VOIP QUALITY MEASUREMENT ENHANCEMENTS USING THE INTERNET CONTROL MESSAGE PROTOCOL

(75) Inventor: Hendrik Scholz, Hamburg (DE)

(73) Assignee: VOIPFUTURE GmbH, Hamburg (DE)

( * ) Notice: Subject to any disclaimer, the term of this patent is extended or adjusted under 35 U.S.C. 154(b) by 301 days.

(21) Appl. No.: 14/000,306

(22) PCT Filed: Feb. 9, 2012

(86) PCT No.: PCT/EP2012/000596
§ 371 (c)(1),
(2), (4) Date: Aug. 19, 2013

(87) PCT Pub. No.: WO2012/113511
PCT Pub. Date: Aug. 30, 2012

(65) Prior Publication Data
US 2013/0329595 A1    Dec. 12, 2013

(30) Foreign Application Priority Data

Feb. 22, 2011    (EP) .................................... 11001462

(51) Int. Cl.
*H04L 12/26* (2006.01)
*H04L 29/06* (2006.01)

(52) U.S. Cl.
CPC ............... *H04L 43/08* (2013.01); *H04L 65/80* (2013.01)

(58) Field of Classification Search
CPC ...... H04L 43/08; H04L 65/80; H04L 12/1868; H04L 1/0035; H04L 43/10; H04L 12/2602; H04L 43/0829; H04L 43/0852; H04L 43/087; H04L 43/0894
See application file for complete search history.

(56) References Cited

U.S. PATENT DOCUMENTS

| | | | |
|---|---|---|---|
| 6,405,251 B1 | 6/2002 | Bullard et al. | |
| 7,385,924 B1 * | 6/2008 | Riddle | ........................... 370/235 |
| 8,331,234 B1 * | 12/2012 | Newton | ................ H04L 43/026 370/231 |
| 2002/0091802 A1 * | 7/2002 | Paul | .................... H04L 12/5695 709/220 |
| 2005/0041642 A1 * | 2/2005 | Robinson | ................ H04L 12/66 370/352 |
| 2005/0135261 A1 * | 6/2005 | Lee et al. | ....................... 370/241 |
| 2005/0169305 A1 * | 8/2005 | Mori | ............................. 370/466 |
| 2005/0188081 A1 * | 8/2005 | Gibson et al. | ................ 709/224 |

(Continued)

FOREIGN PATENT DOCUMENTS

EP    1 039 687 A2    9/2000

*Primary Examiner* — Hoang-Chuong Vu
(74) *Attorney, Agent, or Firm* — Wood, Phillips, Katz, Clark & Mortimer

(57) ABSTRACT

This invention relates to a method for enhancing the quality information of a VoIP session by deducting information from received ICMP messages, in addition to quality information already collected from media streams and/or signaling streams of the same VoIP session. ICMP messages passing on the network link are monitored and correlated with an existing and ongoing VoIP session, i.e. media stream, already monitored by a media plane monitoring unit. A data record for the media stream(s) is expanded with information from the ICMP messages, thus giving a better and more complete quality feedback of the media stream reception at the two communication endpoints.

12 Claims, 17 Drawing Sheets

(56) References Cited

U.S. PATENT DOCUMENTS

| | | | |
|---|---|---|---|
| 2006/0095970 A1* | 5/2006 | Rajagopal | G06F 21/577 726/25 |
| 2006/0268718 A1* | 11/2006 | Jones | 370/235 |
| 2007/0076625 A1* | 4/2007 | Tahara et al. | 370/252 |
| 2007/0127389 A1* | 6/2007 | Klotz et al. | 370/252 |
| 2008/0056153 A1* | 3/2008 | Liu | H04L 12/2602 370/252 |
| 2008/0123687 A1* | 5/2008 | Bangalore et al. | 370/467 |
| 2008/0192740 A1* | 8/2008 | Lorusso et al. | 370/389 |
| 2008/0232269 A1* | 9/2008 | Tatman et al. | 370/252 |
| 2009/0141634 A1* | 6/2009 | Rothstein | H04L 47/2483 370/236 |
| 2009/0323703 A1* | 12/2009 | Bragagnini et al. | 370/401 |
| 2010/0165862 A1* | 7/2010 | Nylander et al. | 370/252 |
| 2011/0149013 A1* | 6/2011 | Khot et al. | 348/14.09 |
| 2012/0300664 A1* | 11/2012 | Hong | H04W 24/00 370/252 |

* cited by examiner

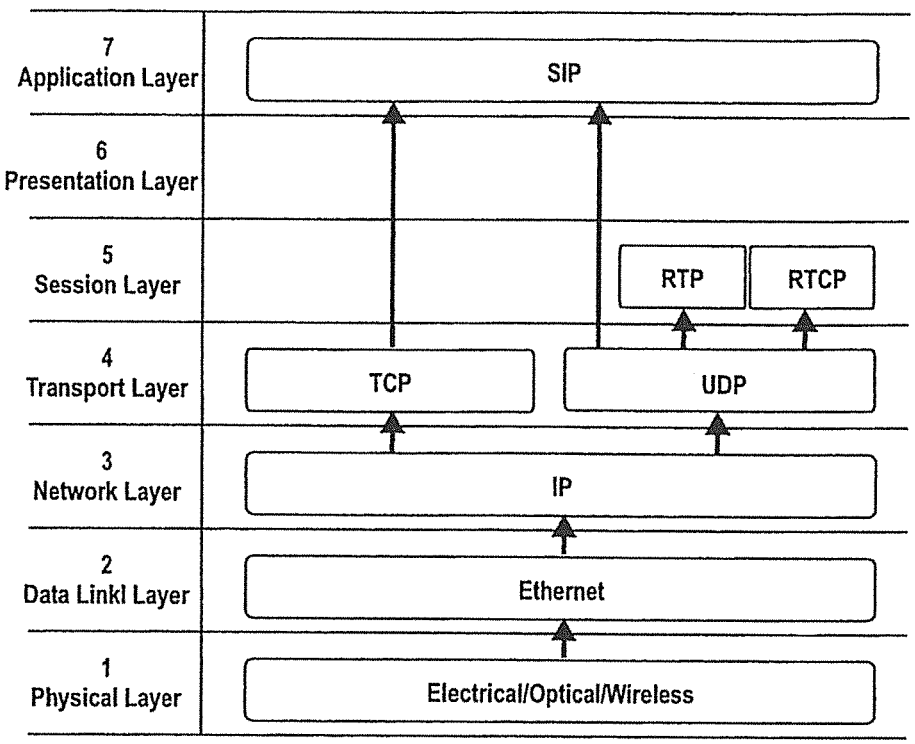
(PRIOR ART) Fig. 1
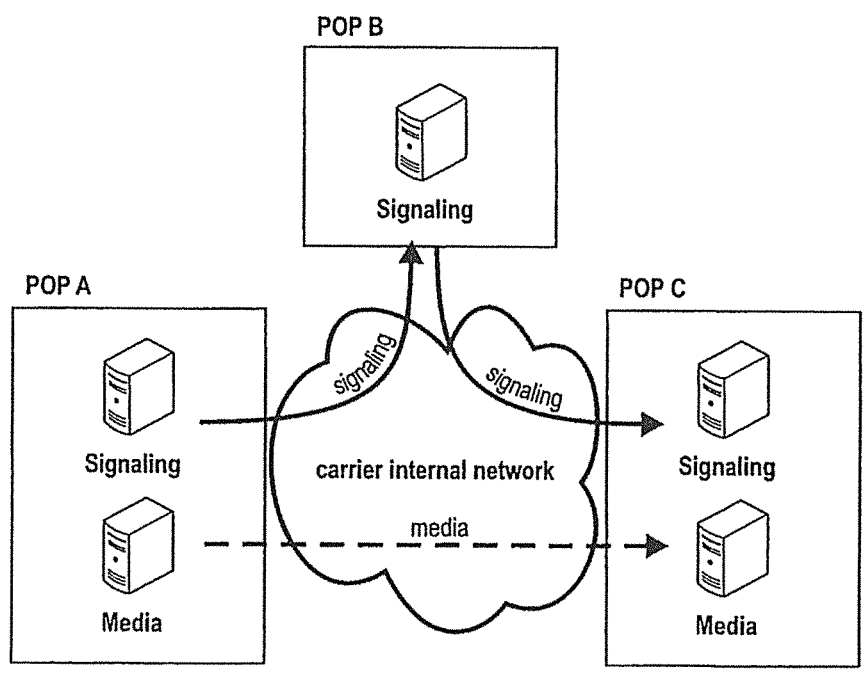
(PRIOR ART) Fig. 2

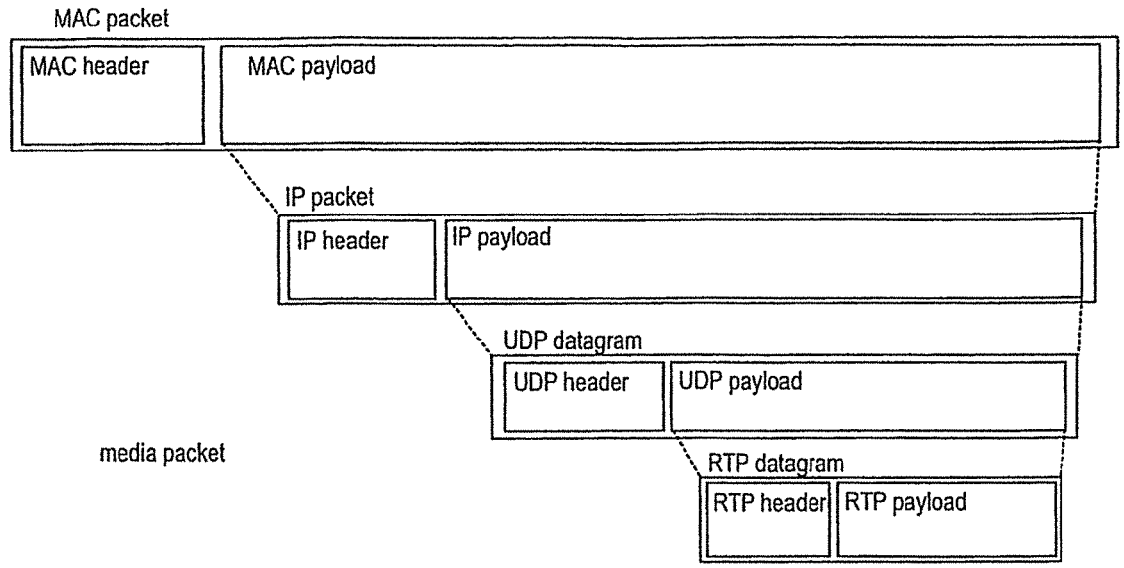
(PRIOR ART)　　　　　　　　Fig. 5
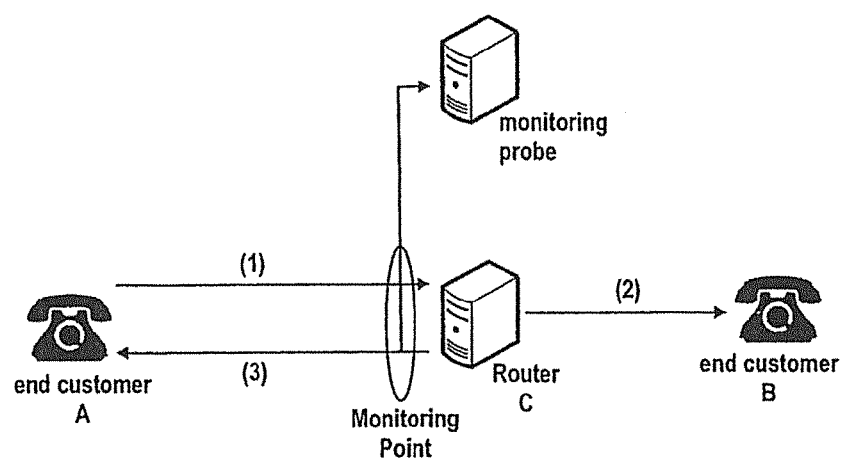
Fig. 6
(PRIOR ART)

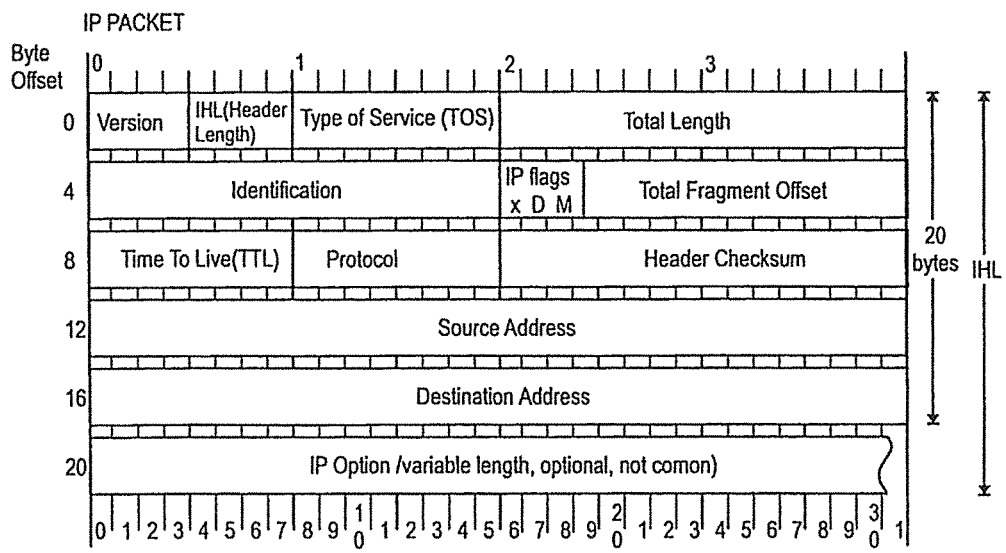
(PRIOR ART)                            Fig. 7
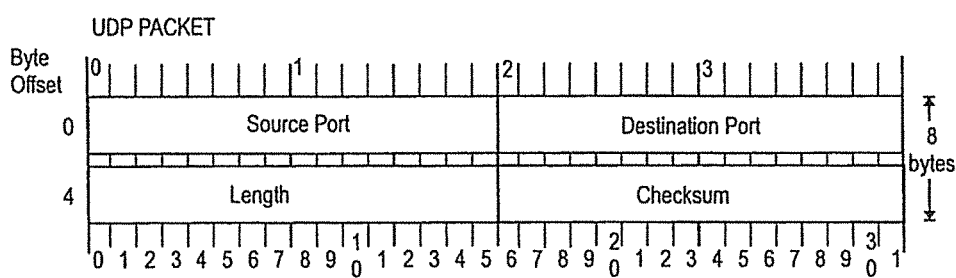
(PRIOR ART)                            Fig. 8

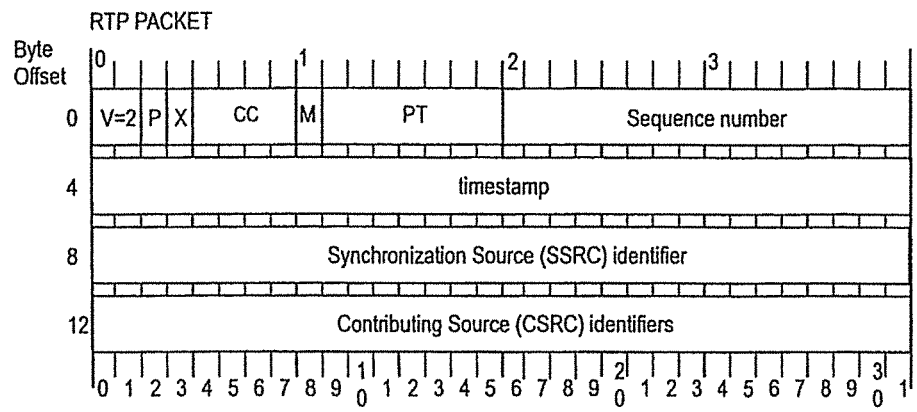
(PRIOR ART)   Fig. 9
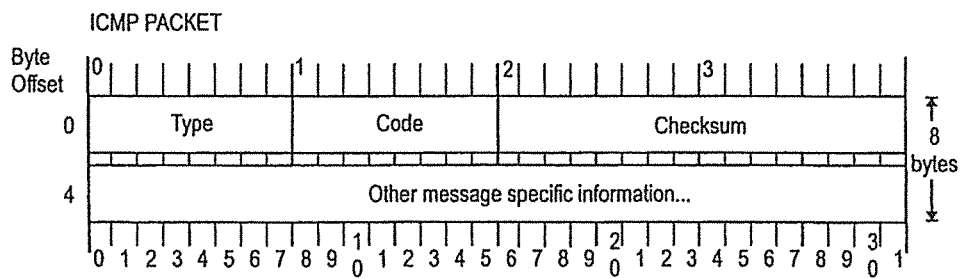
Fig. 10

VOIP QUALITY MEASUREMENT ENHANCEMENTS USING THE INTERNET CONTROL MESSAGE PROTOCOL

FIELD OF THE INVENTION

This invention relates to a method for enhancing the quality information about a media stream transmitted between two communication devices, and in particular to media streams exchanged as part of a VoIP communication session. The invention also relates to a monitoring probe for executing the method.

TECHNICAL BACKGROUND

VoIP—Voice Over Internet Protocol

Traditional phone calls are carried on fixed lines which guarantee a certain transmission quality. Alternatively, voice communications can be carried over packet-switched networks, such as the Internet, and the term "VoIP" refers to a set of protocols which are suited for delivery of such voice communications on the Internet. VoIP protocols use communication equipment (i.e. voice-mailboxes) to communicate over the Internet. Media in general, such as video, text messages or other data may be transported as well using the same VoIP protocols. Other similar terminology used in said respect is e.g. Internet telephony, IP telephony, broadcast telephony or voice over Broadband. The communication between two users or communication equipments is generally named a VoIP session.

VoIP has the advantage of reducing costs, since the communication is routed over existing data networks, and thus avoids the need of maintaining separate networks for traditional voice applications and data networks such as the Internet. Furthermore, VoIP facilitates tasks and provides services that may be more difficult to implement using the public switched telephone network, i.e. fixed lines. It is for example possible to conduct various calls over a single broadband connection. As already hinted at above, other services may be integrated with the normal phone call, such as video conversation, message or data file exchange during the conversation. A selling point for VoIP is that both data and phone calls can be carried on the same line, making the fixed line infrastructure redundant while also better utilizing the single packet-switched network.

On the other hand, VoIP has to deal with problems common to data transmissions via the Internet. In packet-switched environments like the Internet quality guarantees are harder to implement, and thus, quality of VoIP sessions may vary. Overloading the shared infrastructure with data may have a negative effect on the VoIP quality, e.g. increased latency, jitter or packet loss. As a result, monitoring of the VoIP quality is a crucial task for VoIP service providers.

Implementation of VoIP

VoIP employs session control protocols to control the set-up and the tear-down of calls as well as audio-codecs which encode/decode the speech signal, thereby allowing the transmission of the speech over an IP network as digital audio through a stream of media packets.

VoIP services may be considered to consist of a signaling plane and a media plane. On the signaling plane various protocols describe the session (call) flow in terms of involved parties, intermediary VoIP entities (i.e. VoIP proxies, routers) and the characteristics of the VoIP service (call). The media plane typically carries the media information (e.g. audio and/or video data) between the involved parties. Neither the media plane nor the signaling plane alone is sufficient to carry a VoIP service.

VoIP has been implemented in various ways using both proprietary and open protocols and standards, such as:
H.323
IP Multimedia System (IMS)
Media Gateway Control Protocol (MGCP)
Session Initiation Protocol (SIP)
Real-time Transport Protocol (RTP)
Session Description Protocol (SDP)
Real Time Streaming Protocol (RTSP)
Microsoft Media Services (MMS)

On the signaling plane, protocols like SIP (see IETF RFC 3261, "SIP: Session Initiation Protocol", available at http://www.ietf.org) or ITU-T recommendation H.323 (see H.323, "Packet-based multimedia communications systems", Edition 7, 2009, available at http://www.itu.int) are commonly used. With regard to the media plane, protocols like RTP (Real-time Transport Protocol, see IETF RFC 3550, "RTP: A Transport Protocol for Real-Time Applications", available at http://www.ietf.org), MSRP (see IETF RFC 4975, "The Message Session Relay Protocol (MSRP)", available at http://www.ietf.orq) or ITU recommendation T.38 (see T.38, "Procedures for real-time Group 3 facsimile communication over IP networks", Edition 5 (2007) or Edition 6 (2010), available at http://www.itu.int) are used. Other protocols for the media plane are RTSP (see Real Time Streaming Protocol), MMS (Microsoft Media Services protocol) or Real Audio PNM/PNA.

In the following, most of the description will assume that the Real-Time Transport Protocol (RTP) is used in the media plane to carry the media information. However, this is not to be understood as that the invention is limited to the use of RTP alone. Actually, any of the above-mentioned underlying protocols may be used to transport the VoIP media packets over the packet-switched network according to the invention. A skilled person is able to understand the differences between the various protocols and to adapt the embodiments of the invention according to the particulars of the protocols.

Underneath the signaling and media plane the standard protocols of the Internet Protocol Suite, such as IP, UDP (User Datagram Protocol) or ICMP (Internet Control Message Protocol) are used. FIG. 1 discloses an exemplary protocol stack for a VoIP communication, including for example RTP/RTCP in the session layer, UDP in the transport layer and IP in the network layer. Please note that optionally TCP could be used in the transport layer; however, for real-time traffic UDP is commonly used. On the session layer, it is assumed that SIP is used for session signaling. The protocol stack in FIG. 1 is shown only for exemplary purposes to better understand the following implementation examples.

In contrast to the traditional Public Switched Telephone Network (PSTN), both the signaling and media planes may be on different infrastructures, using different protocols and may even take different routes through a network. Where SIP is used for session setup, this is indeed the case, because during the session setup usually signaling-only devices participate, such as SIP proxies, REGISTRARs. This is illustrated in more detail in FIG. 2, which shows three geographically distributed POPs (Point of Presence). The POPs are linked over the carrier's internal network. The signaling data flows on the signaling plane between POP A and C via the signaling-only POP B, which would typically host a centralized routing entity, thus reducing the complexity in the POPs A and C. To prevent sending media traffic from POP A to POP B before sending it to POP C, the VoIP system is configured in a way that would allow the media to flow directly on the media plane between POPs A and C. Typical mid-point monitoring locations would be inside of each POP. Due to the layout of the network, no media traffic would be visible in POP B.

VoIP Quality Monitoring

Measuring Voice Quality

Today two main categories exist for measuring voice quality. The first method is called the subjective method, which involves real human test persons who express their opinion about their perceived voice quality. The average quality rating from all test persons is expressed as the Mean Opinion Score (MOS). The MOS score is expressed as an Absolute Category Rating (ACR) which defines a 5 point scale from 5 (excellent), 4 (good), 3 (fair), 2 (poor) to 1 (bad). An attempt for repeatable measurement results has been made by defining the ITU-T P.800 industry recommendation (see http://www.itu.int/rec/T-REC-P.800-199608-I), which provides normative speech samples to be used for the subjective test method. The results of the subjective test method are further separated in listening and conversational quality. This is expressed by further specifying the type of the MOS score:

$MOS_{LQS}$ (Listening Quality—Subjective)
$MOS_{CQS}$ (Conversational Quality—Subjective)

Since the subjective method does involve human beings, the method is not suited to be automated by test equipment.

The second method for measuring voice quality is called objective method. This method has been designed for automated voice measurement by test and monitoring equipment. The goal of this method is to provide reliable, objective and repeatable measurement results for a voice quality rating that is similar to the subjective method performed by real human beings. Similar to the subjective method, MOS scores for listening and conversational quality are defined:

$MOS_{LQO}$ (Listening Quality—Objective)
$MOS_{CQO}$ (Conversational Quality—Objective)

Intrusive and Non-Intrusive Monitoring of Voice Quality

The objective MOS scores can be measured following two very different approaches. The first approach is an intrusive or active method, where the normative speech samples defined in ITU-T P.800 will be encoded by a VoIP sender, transferred over the packet based IP network and then decoded by the VoIP receiver. The MOS score is then calculated by comparing the known speech input signal from the VoIP sender with the received speech signal from the receiver. The method is called intrusive or active because the test signal is transferred in addition to eventually other VoIP traffic present on the network. Active VoIP monitoring can be used for VoIP readiness tests and prior deployments of a VoIP infrastructure because no other VoIP traffic is required, since the test equipment generates the test data used for measurement itself. Active testing has been defined by the industry recommendation ITU-T P.862 PESQ (see http://www.itu.int/rec/T-REC-P.862-200102-I) and ITU-T P.862.1 (see http://www.itu.int/rec/T-REC-P.862.1-200311-I). A benefit of this method is that all factors that can have an impact on VoIP quality are considered, like the VoIP endpoint, codec, noise, delay, echo and the effects of the IP network. The drawback of active testing is that real voice testing of real calls performed by real users is not measured. Because of the transient nature of VoIP impairments in IP networks, it is quite possible that the results of active testing do not reflect the quality experienced by real users.

The second approach is the passive, non-intrusive measurement method. With passive monitoring, real VoIP calls are measured so that no artificial traffic needs to be generated. The industry standards ITU-T G.107 E-Model (see http://www.itu.int/rec/T-REC-G.107-200904-P) and ITU-T P.564 (see http://www.itu.int/rec/T-REC-P.564-200711-I) define recommendations for passive monitoring of VoIP traffic in IP networks.

FIG. 3 provides an overview on the different measurement concepts, and where in the network they are being applied. In general, monitoring may happen anywhere in the network, where the monitoring component can only report quality impacts based on what traffic traverses its point in the network. Passive monitoring is measuring real VoIP calls without using a reference speech signal. This also means that deployment of passive monitoring solutions is often easier, because ideally only one location has to be visited. Since the speech payload of live calls is unknown, only those statistics/metrics can be considered that are independent from the speech payload. Mainly, these metrics are loss and jitter.

A minimal non-intrusive, passive monitoring system is made from a monitoring probe and a test access port (TAP) connected to the network to be tested and optionally made of a post-processing platform to visualize the measurement results of the monitoring probe. A TAP is a passive network device, which can mirror network traffic without interference of the original network traffic, by creation of a copy of every IP packet. It provides a copy of every packet sent or received on the network, by separating the full-duplex network link into two half-duplex network links, which are then connected to a specialized packet capture card (network interface card—NIC) installed in the probe. These specialized packet capture cards are capable of receiving and processing packets on the physical interface and to provide them to the application layer, nearly without requiring CPU processing time and operation system functionality. Instead of using a TAP to obtain a copy of VoIP packets, the monitoring probe component may be co-located in a live network entity, i.e. Session Border Controller or endpoint. The live component may send a copy of the relevant packets to the monitoring component eliminating the need for a passive TAP.

FIG. 4 shows an exemplary monitoring system of a passive, non-intrusive monitoring solution deployed in a VoIP network. FIG. 4 indicates possible mid-point monitoring locations (TAP positions) for the monitoring probe within a carrier network. Optionally, multiple monitoring probes can be deployed in the network so that RTP streams can be evaluated end-to-end. Furthermore, the impact of installed network hardware like an SBC or media-gateway on the (RTP) stream quality can be analyzed. Having multiple midpoint monitoring locations allows segmenting the data path between VoIP endpoints into smaller parts. Quality observations and possible degradations can thus be narrowed down to a specific network segment.

As mentioned above, passive non-intrusive monitoring solutions for VoIP traffic are based on packet flow analysis of (e.g. RTP) streams, which are used to transfer speech over IP networks. This analysis can be performed either as an integral part of a VoIP device like an IP-phone, media-gateway or at mid-point somewhere in the network between the two parties. Both approaches have advantages and disadvantages.

If the analysis is integrated into a VoIP device, additional important information becomes available to the packet flow analyzer like the size of the jitter buffer, or like information on whether received packets are considered for further processing or are discarded due to late arrival (large jitter). The availability of this information can be a major advantage in accurately estimating the VoIP quality for the end user of the device. Disadvantages are that devices may only have a limited view on the full VoIP service (e.g. an IP-phone) because only the incoming or outgoing calls will be subject to monitoring. Data gathered by a single endpoint is not available to a VoIP provider wide monitoring entity. All other VoIP traffic directed to other end points would be unavailable, unless the flow analysis is integrated into every IP-phone, which is practically hard to achieve. Another disadvantage is that VoIP devices are service specific hardware with limited performance and resources available for additional data processing for which they have not been designed. Packet flow analysis can be a very CPU intensive task, and the results have to be stored somewhere. CPU resources and disk space is something that is not sufficiently available on IP-phones or media-gateways.

Because of these limitations, a monitoring solution based on passive mid-point monitoring as shown in FIG. 4 may be advantageous. In said case, monitoring is performed on copies of the network traffic, which is produced by a network TAP to which the monitoring probes are connected. Thus, the quality measurement doesn't have any impact on the real network traffic and is independent from hardware and manufacturer, while at the same time being able to produce an estimate copy of all live calls being transferred at the network location under test.

The structure of a single VoIP packet in this setup is exemplified in FIG. 5. It should be noted that the header and payload size are variable. The protocols employed for VoIP communication over packet-switched networks are based on the ISO (OSI layer model, see FIG. 1) and include different protocols on the various layers of the model. On the lowest relevant layer the IP transport protocol is used. On each layer the fixed or variable length header is followed by the payload, which contains the packet header of the next protocol and the protocol specific payload.

The VoIP packet as received at the network interface by the monitoring probe may consist of the MAC header (Ethernet, ATM or other MAC protocol header, for example), the IP header, the UDP header and a RTP header followed by the actual payload, being the speech data. The corresponding IP-, UDP and RTP headers are depicted in FIGS. 7, 8 and 9 respectively.

Internet Protocol (IP) packets (see FIG. 7) are the basis of Voice over IP communications. Independent of the underlying physical connection, all data is transported in IP packets. Each IP packet contains a source and destination address to identify the source and destination of the particular packet in the IP address space. Each VoIP endpoint has at least one IP address. Multiple VoIP sessions may share the same IP address, though. In that case higher level protocol information is used to distinguish between packets for various IP endpoints. The IP packet contains a "protocol" field which contains a numeric value representing the payload type transported in this IP packet. The numeric fields' values are standardized. For instance, the numeric value 17 identifies UDP packets and 1 is assigned to ICMP.

An IP packet with the protocol type 17 contains a UDP packet including a UDP header and payload (see FIG. 8). The UDP packet header extends the source and destination address specified on the IP layer by adding a source and destination port for each packet. UDP has been designed to be lightweight and does not include features which could be found in other protocols such as the Transmission Control Protocol (TCP). As a result, it only contains an additional length and checksum field but no payload type.

Throughout most of this document, the RTP is used as an exemplary protocol for media transport over IP based networks, though other suitable protocols including RTSP and MMS may be used in the same way. Each RTP packet (see FIG. 9) contains a variable length header and a variable length payload. Most notably, the first 12 bytes of the RTP header are fixed and contain a synchronization source (SSRC) identifier. This SSRC value is a 32-bit numeric identifier which is contained in every single packet and deemed mandatory by the RTP protocol. It uniquely identifies an RTP media stream.

Shortcomings of VoIP Midpoint Quality Monitoring.

In the example of FIG. 6, the monitoring component observes the data exchanged between end customer A and end customer B. The monitoring takes place between the end customer A and the router C. A VoIP quality monitoring device placed on the network path between VoIP-enabled devices can observe the traffic it sees, collect quality indicators and report on the quality observed. Alternatively, the VoIP quality monitoring device need not be located on the network path between the two communicating devices, but in that case would be supplied with the data traffic by e.g. a TAP device located on the network path between the two communicating devices. In any case, the monitoring equipment receives the single data packets and must associate the various different data packets to streams of packets belonging to the same VoIP session.

The monitoring component may see packets of a certain media stream (1) directed to end customer B. The stream originates from endpoint A and passes through the monitoring point and the router C on its way to end customer B. The network carrying the same stream between the router C and end customer B (depicted as stream (2)) cannot be observed by the monitoring point. The monitoring component can diagnose the VoIP session, however at this point does not know whether the media stream made it to the destination (i.e. end customer B) with the same quality or whether the stream made it all because it only observed packets from media stream (1). Furthermore, the VoIP quality monitoring system of FIG. 6 cannot make any assumptions on stream (2) between router C and end customer B based on the media stream it previously observed.

There can be various reasons why the quality of stream (2) degrades or even why it may not reach its destination (i.e. customer B). The VoIP quality might degrade due to a congested local network in which the customer B is located. Or, the customer B may be located behind a firewall which blocks stream (2) from reaching customer B. In all those cases, the monitoring probe would not be aware of these errors and would still measure a good VoIP quality based on the received media stream (1).

SUMMARY OF THE INVENTION

One object of the invention is to suggest a VoIP quality monitoring which allows overcoming one or more of the above-mentioned shortcomings. In more detail, one object of the invention is to improve the VoIP quality monitoring for cases in which the mid-point monitoring fails to consider the data path between the monitoring point and the data recipient.

The object is solved by the subject matter of the independent claims. Advantageous embodiments of the invention are subject to the dependent claims.

VoIP quality monitoring schemes of the prior art only take into account the data packets of the VoIP media stream(s). However, as explained in the background section the information obtainable from these media streams is quite limited with regard to errors occurring after the media streams pass the monitoring point. Therefore, the idea behind the invention is to use error messages sent for data packets of the media stream. These error messages are usually sent back to the source of the media stream and thus supposedly pass through the monitoring point as well. The monitoring probe monitors the transmission link for these error messages, associates them with the previously received data packets of the media stream and may then collect information therefrom for the media stream quality monitoring. In particular, information included in the error messages is added to the collected quality information of the media stream. The VoIP quality monitored is thus more accurate than the VoIP quality monitoring of the prior art. For instance, the monitoring probe has knowledge on whether and what error occurred while the media stream packets were on the way to the recipient.

Furthermore, using the information from the error messages together with further quality information, the monitoring probe can deduce and distinguish between various error scenarios why the error message was generated in the first place.

Call Detail Records (CDRs) are written by monitoring systems of the prior art and contain details of a phone call, such as the numbers of the calling and called party, date, time and duration of the call. The CDRs can be extended with quality information acquired according to the various embodiments of the invention, as for example the ICMP based quality information or quality information combined from ICMP, signaling and media monitoring components.

The basic and most commonly used protocol for error reporting used in the Internet is the Internet Control Message Protocol (ICMP). Therefore, the description of the invention focuses on this protocol. The ICMP protocol is an integral part of today's Internet, and typically used to provide feedback as to errors happened in the processing of packets belonging to other protocols.

The correlation between the received ICMP error message and a VoIP media stream partly depends on the underlying protocol used for transmission of the media data of the VoIP session. Some of the protocols, such as the Real-time Transport Protocol, include a session identifier, which facilitates the correlation. However, the correlation between the ICMP message and the corresponding VoIP media stream can also be effected through the IP address and (UDP) port tuple. In more detail, the network entity generating the ICMP message, uses as destination IP address and port, the source IP address and source port of the data packet which caused the ICMP error message. Furthermore, the ICMP message comprises part of the relevant data packet as its payload, and since The present invention provides a method for determining by a monitoring probe a reception quality for a media stream, transmitted from a first communication device to a second communication device in a packet-switched communications network. The method steps are performed by the monitoring probe, which monitors data packets of the media stream transmitted from the first communication device. Then, it determines media-related quality information for the media stream, based on the received data packets related to the media stream. The monitoring probe further monitors at least one ICMP, Internet Control Message Protocol, message transmitted from a network device. The at least one ICMP packet relates to the data packets of the media stream and includes information on a transmission error of the data packets of the media stream to the second communication device. The monitoring probe then determines ICMP-related quality information for the media stream, based on the received at least one ICMP message, related to the data packets of the media stream.

According to an advantageous embodiment of the invention, the ICMP-related quality information comprises at least one of the following: type and code values of the ICMP message identifying the kind of transmission error, timestamp of the transmission error, source of the ICMP message.

In a further embodiment of the invention, the ICMP-related quality information includes information on the error scenario that caused the ICMP message to be generated.

Concerning another embodiment of the invention, a pattern database includes various sets of attributes respectively identifying different error scenario patterns that cause an ICMP message to be generated. The attributes relate to the data packets and the at least one ICMP message. A matching error scenario is determined as follows. Attribute values are determined based on the received data packets of the media stream and the at least one ICMP message. Then, the determined attribute values are compared against the attribute values included in the pattern database to identify the particular error scenario pattern that caused the ICMP message to be generated.

According to another embodiment of the invention, signaling messages are monitored that are related to the media stream and are transmitted between the first and second communication devices. The signaling messages are correlated with the media stream. Signaling-related quality information is determined for the media stream based on the signaling messages.

In a further embodiment of the invention, the attribute values in the pattern database also relate to signaling messages, and further attribute values are determined for the media stream based on the received signaling messages.

With regard to another embodiment of the invention, the media stream belongs to a Voice over IP communication session identified by a session identifier. The media stream is transmitted by using the Real-time Transport Protocol. The ICMP messages are correlated with the data packets of the media stream based on the session identifier, included in the data packets of the media stream and in the ICMP messages.

In another embodiment of the invention, the media stream belongs to a Voice over IP communication session between the first and second communication devices. A call detail record is generated for the Voice Over IP communication session. The media-related quality information and the ICMP-related quality information are added to the call detail record of the Voice Over IP communication session.

According to a further embodiment of the invention, a hash value is calculated based on the session identifier and the source and destination addresses of the media stream. The step of correlating the ICMP messages with the data packets of the media stream is based on the calculated hash value.

For another embodiment of the invention, the media stream belongs to a Voice over IP communication session between the first and second communication devices. At least one further media stream belongs to the Voice over IP communication session. In this case, data packets of the at least one further media stream are monitored. The media-related quality information is determined also based on the data packets of the at least one further media stream.

In another embodiment of the invention, the monitoring probe is located on the communication path between the first and second communication devices. Alternatively, at least one test access port is located on the communication path between the first and second communication devices and provides all data passing on said communication path to the monitoring probe.

For an advantageous embodiment of the invention, the network device is located on the communication path between the monitoring probe and the second communication device.

The invention further provides a monitoring probe for determining a reception quality for a media stream, transmitted from a first communication device to a second communication device in a packet-switched communications network. A media monitoring unit of the monitoring probe monitors data packets of the media stream transmitted from the first communication device. A processor of the monitoring probe determines media-related quality information for the media stream, based on the received data packets related to the media stream. An ICMP, Internet Control Message Protocol, monitoring unit of the monitoring probe monitors at least one ICMP message transmitted from a network device. The at least one ICMP packet relates to the data packets of the media stream and includes information on a transmission error of the data packets of the media stream to the second communication device. The processor determines ICMP-related quality information for the media stream, based on the received at least one ICMP message, related to the data packets of the media stream.

According to an advantageous embodiment of the invention, a storage unit of the monitoring probe includes a database, comprising the media-related quality information and the ICMP-related quality information. The ICMP-related quality information comprises at least one of the following: type and code values of the ICMP message identifying the kind of transmission error, timestamp of the transmission error, source of the ICMP message.

In another embodiment of the invention the ICMP-related quality information further includes information on the error scenario that caused the ICMP message to be generated.

The monitoring prove according to another embodiment of the invention comprises a pattern database in the storage unit. The pattern database includes various sets of attributes respectively identifies different error scenario patterns that cause an ICMP message to be generated, the attributes relating to the data packets and the at least one ICMP message. The processor determines attribute values based on the received data packets of the media stream and the at least one ICMP message. The processor compares the determined attribute values against the attribute values included in the pattern database to identify the particular error scenario pattern that caused the ICMP message to be generated.

Concerning another embodiment of the invention, a signaling monitoring unit of the monitoring probe monitors signaling messages that are related to the media stream and are transmitted between the first and second communication devices. A media/signaling correlation unit of the monitoring probe correlates the signaling messages with the media stream. The processor determines signaling-related quality information for the media stream based on the signaling messages.

According to another embodiment of the invention, the media stream belongs to a Voice over IP communication session identified by a session identifier. The media stream is transmitted by using the Real-Time Transport Protocol. An ICMP/media correlation unit of the monitoring probe correlates the at least one ICMP message with the data packets of the media stream based on the session identifier included in the data packets of the media stream and the at least one ICMP message.

In a further advantageous embodiment of the invention, the media monitoring unit and the ICMP monitoring unit are respectively connected to a test access port, which is located on the communication path between the first and second communication devices and provides the media monitoring unit and the ICMP monitoring unit with all data packets passing on said communication path.

The invention further provides a computer readable storage medium storing instructions that when executed by a processor of a monitoring unit cause the monitoring unit to monitor data packets of the media stream transmitted from the first communication device. Furthermore, media-related quality information is determined for the media stream, based on the received data packets related to the media stream. At least one ICMP, Internet Control Message Protocol, message transmitted from a network device is monitored. The at least one ICMP packet relates to the data packets of the media stream and includes information on a transmission error of the data packets of the media stream to the second communication device. ICMP-related quality information is determined for the media stream, based on the received at least one ICMP message, related to the data packets of the media stream.

BRIEF DESCRIPTION OF THE FIGURES

In the following the invention is described in more detail with reference to the attached figures and drawings. Similar or corresponding details in the figures are marked with the same reference numerals.

FIG. 1 shows an exemplary protocol stack for a VoIP communication,

FIG. 2 shows three geographically distributed Points of Presence (POPs) which are linked over the carrier's internal network, FIG. 5 shows the format of a VoIP packet, including MAC-, IP-, UDP- and RTP headers and the RTP payload, FIG. 6 illustrates a network scenario in which a media stream is provided from customer A via router C to customer B, wherein a monitoring probe is located between the router and end customer A, media stream (3) illustrates an ICMP message send back by router C to host A in case link (2) is not usable, FIG. 7 shows the packet format of an IP packet, FIG. 8 shows the packet format of an UDP packet, FIG. 9 shows the packet format of an RTP packet, FIG. 10 shows the packet format of an ICMP packet.

DETAILED DESCRIPTION OF THE INVENTION

Figure 3:
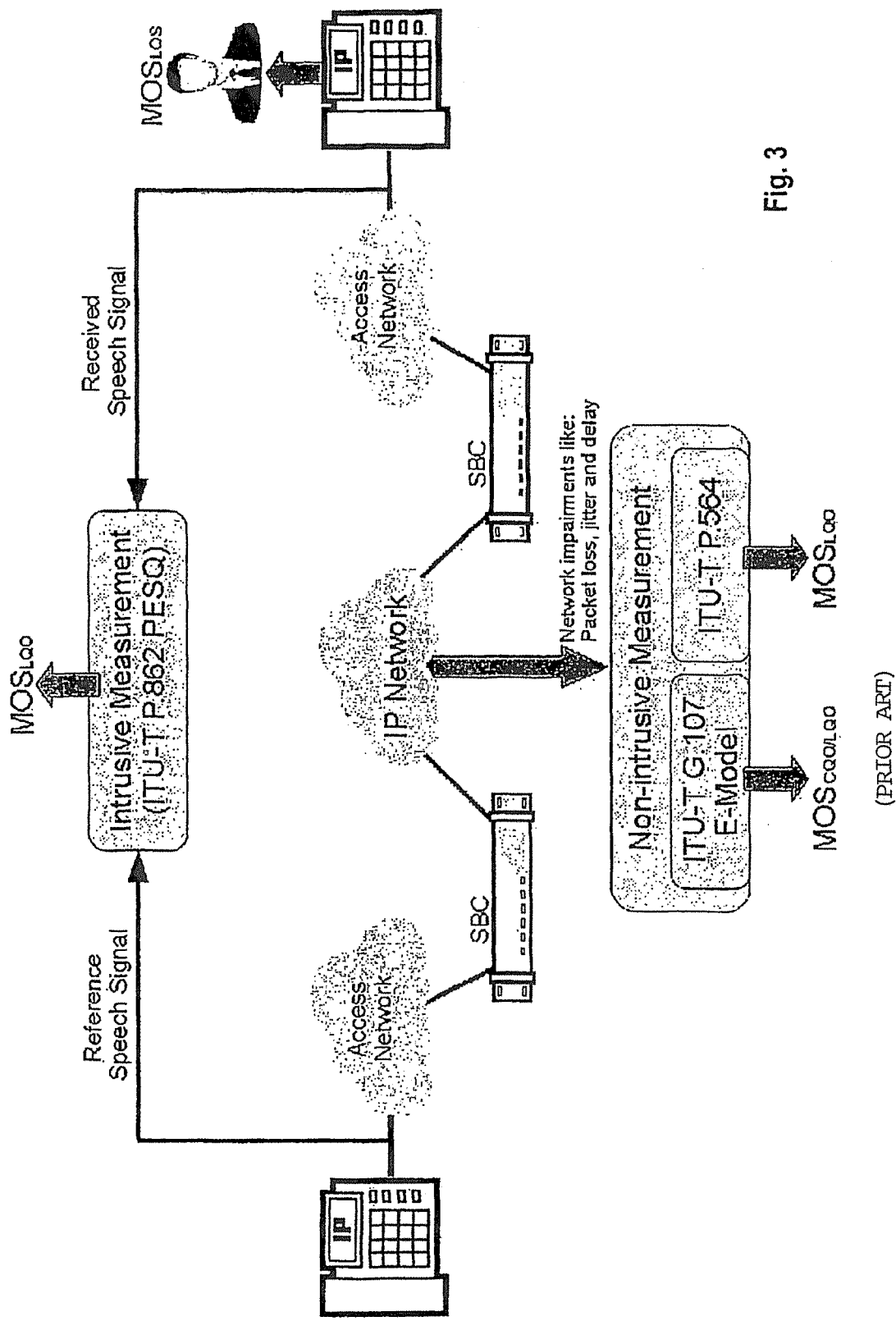
FIG. 3 shows an overview on the different measurement concepts, particularly intrusive measurements and non-intrusive measurements.

The following paragraphs will describe various embodiments of the invention. For exemplary purposes only, most of the embodiments are outlined in relation to mainly VoIP services as an example for a media service, but the invention is not limited to VoIP services. For example, the invention may also be used for other types of media services provided in packet-switched networks.

The explanations given in the Technical Background section above are intended to better understand the mostly VoIP specific exemplary embodiments described herein and should not be understood as limiting the invention to the described specific implementations of processes and functions in a packet-switched communication network.

As indicated above, the invention generally relates to a method for determining the quality for a media stream transmitted over a packet-switched network from one communication node to another. One key feature for the present invention is the use of information from ICMP messages, related to the media stream transmission, to extend and thus enhance media stream quality information which was already collected by other monitoring probes, e.g. a media and/or signaling plane monitoring probe. In other words, the quality information gathered for a media stream is also based on information from the ICMP messages.

ICMP messages include information on errors that occurred for the transmission/routing of data packets of the media stream. Accordingly, the embodiments of the invention provide an ICMP monitoring probe to monitor the packet-switched network for ICMP messages relating to the media stream. By taking ICMP messages into account as well, e.g. an ICMP correlation unit can deduce crucial information on the quality of the media stream(s) and thus of the VoIP session. The type of the error and the time at which it occurred can help to learn the underlying reason for the failure. This will become clearer with the more detailed explanations given below.

The correlation between received ICMP messages and the media stream can be based upon a session identifier in the data packets. Alternatively or in addition, the source and destination IP addresses and port tuples for the data packets and the ICMP messages can be matched, to allow an association between the media stream and the ICMP message.

The correlation is performed in an ICMP correlation unit which may or may not be co-located with the ICMP monitoring probe. The ICMP correlation unit receives the necessary information from the media plane probe and ICMP monitoring probe. The media streams are registered by the media plane probe in a media plane database with their source/destination IP address and port numbers included in the data packet headers of the media streams. An ICMP error message includes (at least) the IP header of the data packet generating the ICMP error message (plus, a limited payload of said data packet) and thus includes the source/destination IP address and UDP/TCP port numbers where applicable. Furthermore, depending on the ICMP generator implementation, the data packets and the ICMP error message may further include a session identifier which also enables a direct association between the media stream and the monitored ICMP message.

The ICMP error message thus identifies the data packet which caused the error, and also provides information as to the kind of error that occurred through a type & code field combination. This information may be added to the quality information of the media stream, determined by the media plane monitoring component, and thus helps to determine the quality for the media stream.

Furthermore, the invention also relates to an implementation of these methods in hardware and software, and provides a monitoring probe for carrying out the above-described method.

ICMP—Internet Control Message Protocol

ICMP messages are an integral part of today's Internet. They typically report errors in the processing of packets belonging to other protocols. ICMP messages for itself do not make the Internet perform more reliable but provide feedback to other protocols so that these may take appropriate actions to prevent further errors to occur.

A sample application for ICMP messages in the Internet is to notify the sender of a connection request that the destination is not reachable. For the following, the basic scenario of FIG. 6 is assumed in which one host (end customer A) tries to reach another host (end customer B). It may be assumed for exemplary purposes that the connection could be using the TCP (Transmission Control Protocol) protocol which for instance represents a web browser on host A trying to access a website on host B. The user request translates to a TCP connection setup being sent across the Internet to host B. For this scenario, the Internet network is reduced to router C which represents the network between the two hosts.

Host A generates a TCP message (e.g. connection setup request) and sends it to router C (messages (1)). Host A does not directly send the TCP message to host B as it does not know where exactly host B is located nor does it have a direct connection to it. Router C is more knowledgeable and knows the so called routes to other hosts or networks. For some reason the network path (2) between router C and host B is unusable. As host B never receives the TCP message, it cannot respond to the connection setup request of host A.

Host A has to wait for a prolonged time before it can assume host B to be unreachable, after which time it will retry the connection setup or display an error message to the user of host A.

As router C knows that host B is unreachable it does generate an ICMP error message and sends it to host A (message (3)). This ICMP message is of the 'host unreachable' type (defined in the ICMP standard and explained further below in more detail) and thus informs host A that host B is unreachable. The ICMP message will arrive at host A from a different source (router C instead of host B) than expected for the TCP connection which host A started. To allow host A to match the ICMP error message to its own TCP connection setup message, the ICMP message also contains a part of the TCP message which triggered the error as payload. By looking at the payload of the ICMP message, host A can deduct which connection request triggered the error and can then forward the error message to the appropriate application on the local machine.

This ICMP error message mechanism is not restricted to TCP connection setups and unreachable hosts but is used by most protocols that use the Internet Protocol Suite to communicate over the Internet.

FIG. 10 depicts an exemplary ICMP packet header. ICMP packets are identified as the payload of IP packets with the protocol type 1. Each ICMP packet contains an 8-byte header with a variable-sized data section, wherein the first 4 bytes of the header will be consistent including a one-byte ICMP type field, a one-byte ICMP code field and a checksum of the entire ICMP message in the third and fourth bytes of the ICMP header. The two-piece type & code combination identifies the type of error which caused the ICMP message to be generated. The contents of the remaining 4 bytes of the header will vary based on the ICMP type and code. Most common are errors of the 'Destination Unreachable' type. The ICMP code further specifies a sub-type, e.g. to distinguish between an unreachable host and unreachable port.

The variable-sized data section of the ICMP error message includes the complete IP header and at least the first 8 bytes of the packet that generated the ICMP error message. Since the size of the payload is variable and with more bandwidth and more complex protocols available today, some implementations include more than the 8 bytes of the packet that generated the error into the ICMP message payload, e.g. 56 or 88 bytes.

It is assumed that protocols which utilize port numbers would include these in the first 8 bytes of the protocol specific header. By including at least 8 bytes of the data packet into the ICMP payload, the ICMP error message thus also contains the port numbers, thereby allowing a receiving host to evaluate these while processing the ICMP error message.

Figure 11:
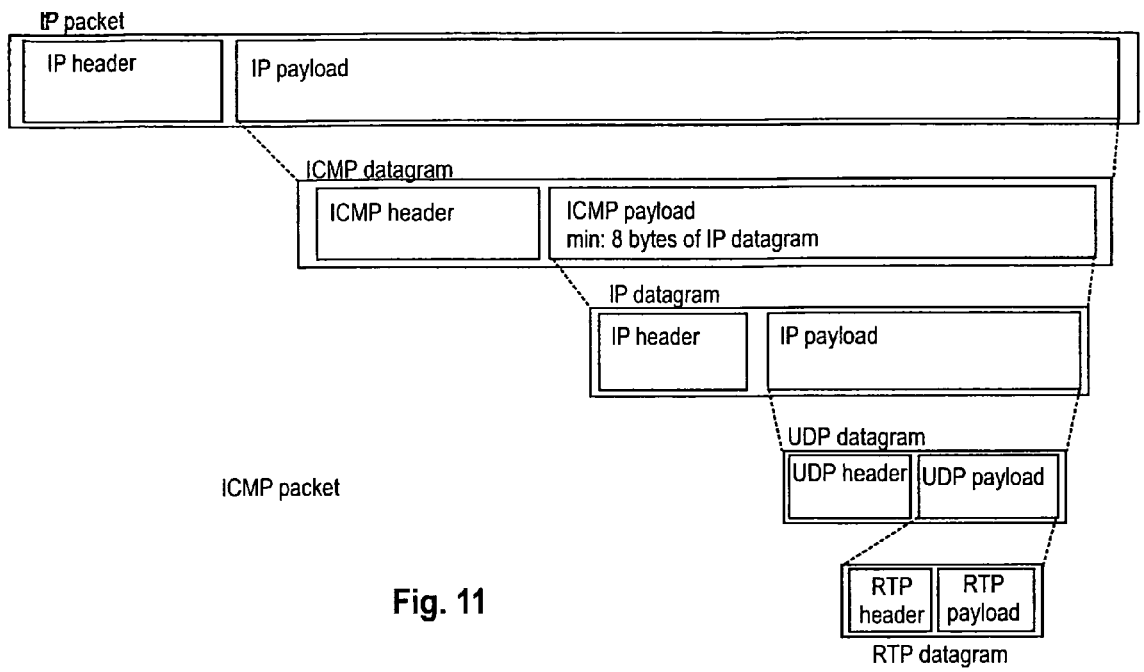
FIG. 11 shows the encapsulation layers of an ICMP packet, including IP-, ICMP-, IP-, UDP- and RTP headers.

An example ICMP message generated as 'port unreachable' response to an RTP packet may be composed as explained in the following with reference to FIG. 11. The ICMP message starts with the IP header to identify the source and destination of the IP packet itself. The destination IP address in the IP header for the ICMP message is the source of the original RTP packet. The following ICMP header defines the error type—port unreachable for example. The ICMP payload contains the IP header and depending on the implementation a part of the UDP header and RTP header. This IP header is copied from the original RTP packet and thus shows the RTP packet destination as IP destination address. At least 8 bytes worth of data are included beyond the IP header. In the RTP packet case this would be a UDP header. The first four bytes of the UDP header include the UDP source and destination port. These ports are important in the VoIP communication and part of the signaling protocols involved.

Optionally—depending on the implementation of the ICMP generator—a part of the RTP header and payload may also be included in the ICMP message payload. If the RTP header is included, the SSRC field is a help to match this ICMP message to the according RTP stream as will be explained further below.

ICMPv6 (defined in RFC 4443) is the implementation for IPv6 and also performs error reporting, diagnostic functions (e.g. ping) or neighbor discovery. It should be noted however that the present invention works with any version of ICMP.

In the following Table 1 a list of control messages is listed together with the corresponding ICMP code and type identifiers.

| Type | Code | Description |
|---|---|---|
| 0 - Echo Reply | 0 | Echo Reply (used for ping) |
| 1 and 2 | | Reserved |
| 3 - Destination Unreachable | 0 | Destination network unreachable |
| | 1 | Destination host unreachable |
| | 2 | Destination protocol unreachable |
| | 3 | Destination port unreachable |
| | 4 | Fragmentation required, and DF flag set |
| | 5 | Source route failed |
| | 6 | Destination network unknown |
| | 7 | Destination host unknown |
| | 8 | Source host isolated |
| | 9 | Network administratively prohibited |
| | 10 | Host administratively prohibited |
| | 11 | Network unreachable for TOS |
| | 12 | Host unreachable for TOS |
| | 13 | Communication administratively prohibited |
| 4 - Source quench | 0 | Source quench (congestion control) |
| 5 - Redirect message | 0 | Redirect Datagram for the network |
| | 1 | Redirect Datagram for the host |
| | 2 | Redirect Datagram for the TOS & network |
| | 3 | Redirect Datagram for the TOS & host |
| 6 | | Alternate host address |
| 7 | | Reserved |
| 8 - Echo Request | 0 | Echo Request |
| 9 - Router Advertisement | 0 | Router Advertisement |
| 10 - Router Solicitation | 0 | Router discovery/selection/solicitation |

| Type | Code | Description |
|---|---|---|
| 11 - Time Exceeded | 0 | TTL expired in transit |
| | 1 | Fragment reassembly time exceeded |
| 12 - Parameter Problem: Bad IP header | 0 | Pointer Indicated the error |
| | 1 | Missing a required option |
| | 2 | Bad length |
| 13 - Timestamp | 0 | Timestamp |
| 14 - Timestamp reply | 0 | Timestamp reply |
| 15 - Information Request | 0 | Information Request |
| 16 - Information Reply | 0 | Information Reply |
| 17 - Address Mask Request | 0 | Address Mask Request |
| 18 - Address Mask Reply | 0 | Address Mask Reply |
| 19 | | Reserved for security |
| 20-29 | | Reserved for robustness experiment |
| 30 - Traceroute | 0 | Information Request |
| 31 | | Data Conversion Error |
| 32 | | Mobile Host Redirect |
| 33 | | Where are you (originally meant for IPv6) |
| 34 | | Here I Am (originally meant for IPv6) |
| 35 | | Mobile Registration Request |
| 36 | | Mobile Registration Reply |
| 37 | | Domain Name Request |
| 38 | | Domain Name Reply |
| 39 | | SKIP Algorithm Discovery Protocol |
| 40 | | Photuris, Security Failures |
| 41 | | ICMP for experienced mobility protocols such as Seamoby |
| 42-255 | | Reserved |

ICMP for VoIP Quality Monitoring

Figure 12:
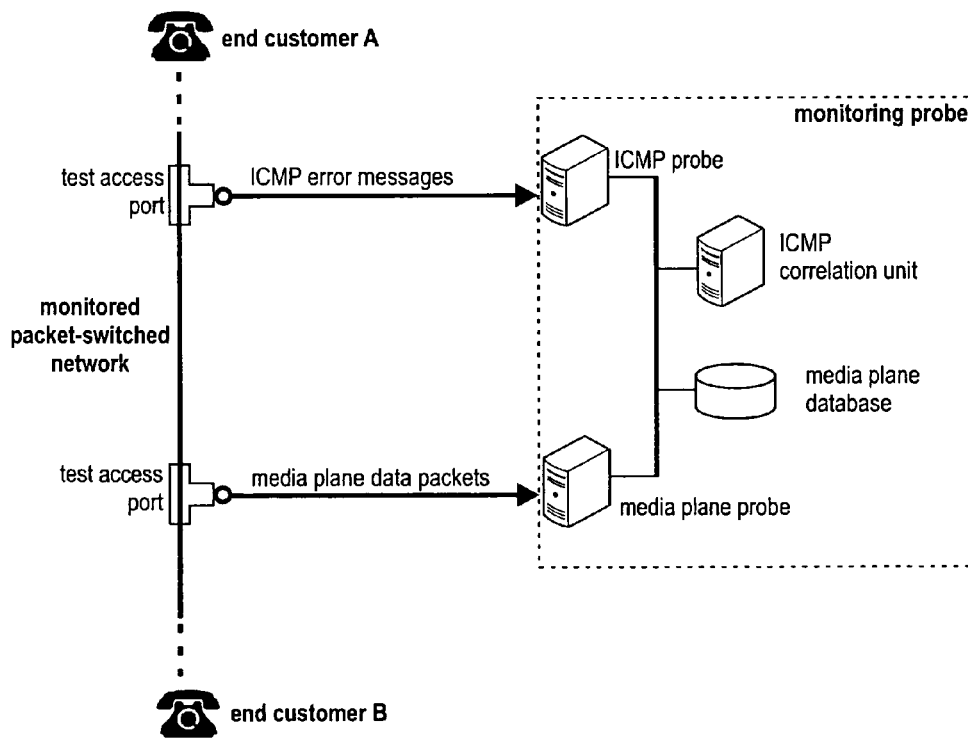
FIG. 12 illustrates the network deployment for the VoIP monitoring probe according to one embodiment of the invention, in which a media plane probe and an ICMP monitoring probe are used to determine the quality of the VoIP session.
Figure 13:
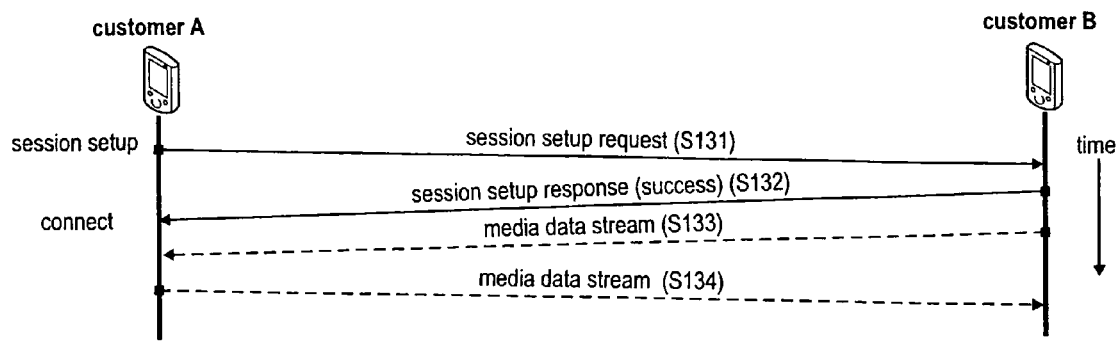
FIG. 13 is a signaling diagram illustrating the message exchange for a session setup between two customers.

In the following, the scenario according to FIG. 12 is assumed for the explanation of some embodiments of the invention. FIG. 13 is a signaling diagram depicting the session setup and corresponding media exchange. Customer A starts a VoIP communication over a packet-switched network, such as an IP-based network, with customer B. To said end, customer A sends a session setup request message (S131) to customer B, who responds with a session setup response (successful) message (S132). Afterwards, customer B starts transmitting the media stream (S133) to customer A. Customer A, after receiving the session setup response message, starts transmitting a media stream (S134) to customer B. Overall, a VoIP call usually is composed of a signaling stream and at least two media streams. Thus, multiple streams exist on the media plane. Desirable features e.g. codec changes, bandwidth saving mechanisms like comfort noise, silence suppression or ring tones may trigger additional streams.

The data of the media plane is packaged into packets on the transmitter side, here e.g. customer A. The packets are transported over the network independently from one another. The receiver of the packets—identified by the destination IP address and port of the packet—has to regroup and sometimes reorder the received packets so as to get the initial stream of single packets as transmitted from the transmitter side.

The media plane of the VoIP service may carry the media plane data in form of RTP streams, which is made up from individual RTP packets. The transmitter of an RTP stream generates RTP packets by splitting the media data into smaller pieces, which are usually relatively small to reduce delays between sender and receiver. As a result, many RTP packets, typically 50 packets per second, are created and form a single RTP stream. The VoIP media data is thus transmitted as RTP payload from customer A to customer B, and vice versa, thereby passing the monitoring location for the VoIP quality monitoring probe.

The VoIP quality monitoring probe is located at some place in the network to monitor all data packets passing through the packet-switched network at its location. The location of the monitoring probe or a corresponding test access port is chosen such that it is able to monitor all data packets of the relevant VoIP sessions. The specific locations of one or more probes highly depend on the application and VoIP session flows. It is preferable to locate the monitoring equipment as close to the end customers as possible in order to monitor the VoIP quality as the customer would experience it. The further away the monitoring equipment is from the end customer, the more network devices in between the monitoring equipment and the end customer may impact the VoIP quality. Generally, more monitoring equipment is needed in order to monitor close to the end customers. VoIP carriers aggregate VoIP traffic, e.g. using Session Border Controllers (SBC). At these locations (also named POPs—Points of Presence) often thousands of concurrent VoIP sessions can be monitored by a single monitoring instance, thus reducing the total cost of ownership of the VoIP quality monitoring solution.

In the following embodiment of the invention, the VoIP quality monitoring probe is assumed to be split into several logically different components. However, it should be apparent to a skilled person that these components may or may not be co-located and may or may not share software and/or hardware.

The VoIP quality monitoring probe is mainly composed of an ICMP monitoring component (IM component, named ICMP probe in FIG. 12), a media plane monitoring component (MM component, named media plane probe in FIG. 12) and an ICMP correlation unit. Typically, all monitoring components are co-located in one physical machine. Also, several MM and ICMP monitoring components may be provided in the network, while there may still be only one ICMP correlation unit.

The IM and MM components are capable to monitor the traffic on the packet-switched network. It is assumed that the ICMP probe and MM probe are probes of a minimal non-intrusive, passive monitoring system. The respective monitoring probes are thus connected to the packet-switched network via one or more test access ports (TAPS) as an example. A TAP is a passive network device that mirrors network traffic of the packet-switched network without interference of the original network traffic. It provides a copy of every packet sent or received on the network, by duplicating the data packets observed on the physical layer of the network. The MM and ICMP probe may monitor either the same network link at the same physical location or different links at the same or geographically separated locations.

The exemplary setup may be replaced with a single test access port (TAP) which monitors the network and copies the corresponding packets to the ICMP probe and media plane probe respectively. Additionally, a further embodiment of the invention may provide the ICMP and media monitoring components on one physical machine, thus making one of the TAPs redundant.

In any case, the MM and ICMP monitoring probes receive all data packets relating to media streams and also the corresponding ICMP messages.

A media plane database is provided to store data records for the media stream monitored on the packet-switched network. It is assumed in the following embodiment of the invention that the media plane database is logically separate from the ICMP monitoring probe and the media plane probe. The media plane database is centrally located as depicted in FIG. 12. Nevertheless, the media plane database may be co-located with any of the components as well.

The ICMP correlation unit allows for the correlation of a received ICMP error message with a media stream observed by the media monitoring probe. Again, the ICMP correlation unit may or may not be co-located with the ICMP monitoring probe and/or the media monitoring probe.

The media monitoring probe observes single media packets on the monitored network link and forms media streams from these single media packets. In general, this grouping of single media packets into media streams is based on transport addresses and protocol-specific criteria. The detailed procedure for this step however depends on the underlying media protocol used. For instance, assuming the RTP protocol, the source and destination IP addresses, the source and destination UDP ports and the unique SSRC value from the RTP header may be used in said respect. RTP protocol sequence numbers and timestamps can be further used to order the distinct packets to make up the RTP media stream.

A corresponding data record is generated by the MM component for each media stream. The data record may be stored internally by the MM component and/or in the central media plane database. When the MM component receives a packet which does not match an existing media stream in the corresponding media plane database, it creates a new data record for the new media stream in the media plane database. Packets can then be matched to the existing media streams by comparing the transport layer information and the SSRC value with data records in the database for existing media streams.

If no packets are received for a single media stream for a certain time, the media stream is considered ended and the associated data record can be removed from the database. However, a short interruption in the media stream should not trigger the removal of the corresponding data record of the media stream from the database, since features like voice activity detection are to be taken into account. Therefore, the time before the media plane probe can consider the media stream to have ended can be multiple seconds.

It should be noted that though media plane packets may be lost, the MM component should nevertheless be able to form the media stream even with the lost media plane packets of said media stream.

As will be outlined, the ICMP probe and the media plane probe both generate information that will be used for determining the VoIP session quality. In order to track running sessions and streams, the entities need to store information in a database while the streams are not finished. Database records written by the MM component contain data describing the unidirectional media streams it monitored. In other words, in an exemplary embodiment of the invention, one data record can be generated in the media plane database for each unidirectional media stream. There may be various possibilities of what kind of data is to be stored for describing a media stream and its quality. In the following, an example is presented how this can be implemented. However, it should be noted that other implementations are viable as well, for instance, comprising less or more or different items of information than suggested.

Characteristics of each media stream can be grouped into two categories. The transport and RTP header information characterize the media stream as such and allow the forming of the media streams, whereas the stream quality information enables VoIP quality related processing of the media stream. In general, the transport information is the same for all media packets processed as part of a single media stream. The stream quality information includes information covering all media packets and may be aggregated or stored on a per-packet basis.

Transport Media Information
   Source and destination IP address
   Source and destination UDP port
   RTP header synchronization source (SSRC) value
   RTP payload type
Stream Quality Information
   Timestamp information (start, end time)
   RTP format violations
   Protocol conformance
     Sequence errors
     DSCP errors
   Transport information
     Packet interval and jitter statistics
     Packet loss
     Duplicate packets
   MOS values
     Per time-slice (e.g. every 5 seconds)
     Minimum/average/maximum value for entire stream duration
   Events
     Comfort noise
     Silence suppression
     DTMF tones
     Code changes
     Marker bits As apparent from above, in addition to measured values (e.g. jitter between multiple media packets), the database may also contain calculated information like MOS (Mean Opinion Score) values and information about impairments experienced by the receiver of the stream. This information allows giving a detailed quality report of the media stream.

It should be also noted that the media data record could also refer to all media streams related to one session. As explained above, a session at least comprises two media streams, respectively one in each direction, and the media monitoring probe can monitor all media streams and determine the quality information for all media streams. Accordingly, the corresponding data record (Call Detail Record, CDR) includes information on all the media streams that have been monitored for one communication session.

The ICMP monitoring probe identifies ICMP packets in the observed traffic, which however still have to be correlated with the corresponding media streams of the VoIP service. This is done based on the payload of the ICMP message itself. As set out before, the ICMP message payload comprises the first (minimum 8) bytes of the data packet which generated the ICMP message. Therefore, the ICMP message provides sufficient information for successfully associating the ICMP message with the data packet that caused it to be generated and further with the media stream to which said data packet belongs.

The correlation as such can be performed by an ICMP correlation unit which receives the necessary information of the ICMP message from the ICMP probe and has access to the media plane database used by the media monitoring probe to store the data records for the observed media streams. The ICMP correlation unit matches the ICMP message to the media stream as observed by the media monitoring component based on the communication path of the data packet and the ICMP message. This approach is valid for the most common transport protocols, such as UDP, TCP, SCTP, which have in common that the first four bytes of their protocol headers contain a 2 byte source and 2 byte destination port. Consequently, all ICMP messages generated for any applications of these protocols (including VoIP, web surfing, email, file sharing etc) contain a full IP header and the source and destination port tuple of the data packet which triggered the error.

The ICMP correlation unit can use this information to search for a media stream in the media plane database of the MM component. By comparing the IP addresses and ports found in the ICMP message against the IP address ports stored in the data records per media stream in the transport media information section of the media plane database, the ICMP correlation unit is able to determine to which media stream the ICMP message belongs.

Furthermore, if the underlying transport protocol is the Real-time Transfer Protocol, then the correlation unit can additionally use a unique identifier in the RTP header (the Synchronization Source Identifier, SSRC) for the correlation—if available. The SSRC identifier can also be used in the media monitoring probe to group single RTP packets into RTP streams. Ideally, the SSRC identifier can thus serve as sort of a database key.

According to one embodiment of the invention, the ICMP monitoring component obtains the ICMP message and extracts the SSRC value from the RTP portion of the ICMP message. The ICMP correlation unit then uses the SSRC to search the media plane database data records for the matching and active media stream. If no entry is found in the media database for the SSRC value, the ICMP message is dropped. In another embodiment of the invention the ICMP correlation unit may not drop the ICMP message but fall back to the traditional ICMP matching mechanism outlined in the next step. If one or more entries are found, the ICMP correlation unit has to verify further that the ICMP message does match the media stream data. The transport media information in the data record of the matched RTP media stream has an IP source and destination address and in addition the source and destination port of the UDP layer. These two address and port tuples have to be present in the IP and UDP portions of the ICMP payload. The ICMP correlation unit compares these sets of tuples against each other and if they match, the ICMP message observed belongs to the RTP stream matched.

The media database entry for the matched RTP media stream can then be expanded by the information of the ICMP message, as will be explained further below.

An alternative embodiment of the invention for finding a match in the data record of the media plane database is explained in the following. In this case it is also assumed that the RTP protocol is used for transmitting the media packets. The SSRC from the RTP header of the ICMP payload is combined with the IP and UDP transport information (source and destination IP addresses and ports) to form a hash key. The hash key can then be used to look up entries in the data records of the media plane database. Correspondingly, when storing the data record for a media stream, the media monitoring probe can already calculate the hash key and store same together with the data record in the media plane database. Then, the ICMP correlation unit can easily find the matching data record by using the hash key. The hash key algorithm can be freely defined, e.g. the MD-5 hash sum over the concatenated strings of IP addresses, ports and the SSRC value could be used.

After a successful correlation of the ICMP error message and a media stream according to one of the above embodiments of the invention, the corresponding data record in the media plane database may be expanded with information gained from the ICMP error message.

According to one embodiment of the invention, an ICMP event entry is added to the Stream Quality Information in the data record of the media plane database. The ICMP event may comprise the type and code values of the ICMP header, identifying the kind of error that occurred. Furthermore, the ICMP event entry of the data record may comprise the timestamp of the ICMP event. Other information may be included as well, such as the source of the ICMP error message, which is the network entity that could not forward the data packet for some reason. This information can be deducted from the source IP address of the ICMP packet (not the payload) itself.

According to a further embodiment of the invention, the information from the ICMP message (e.g. type, code, timestamp, source, media stream direction) is associated with information from the media stream to describe a failure scenario that caused the network entity to drop the data packet of the media stream and to then generate the ICMP error message. In this case, the data record of the media stream in the media plane database is not enriched by the ICMP event as such (see above), but is enriched with information on the failure scenario. One of the advantages achieved thereby is that there is no need to save several ICMP events in the data record; e.g. if a firewall blocks data packets, this may lead to one ICMP error message for each data packet, which would cause the ICMP monitoring probe to enrich the data record of the corresponding media stream with a plurality of ICMP events. Instead, the plurality of ICMP events is considered to deduce why the error has occurred, and then the findings are stored.

Figure 14:
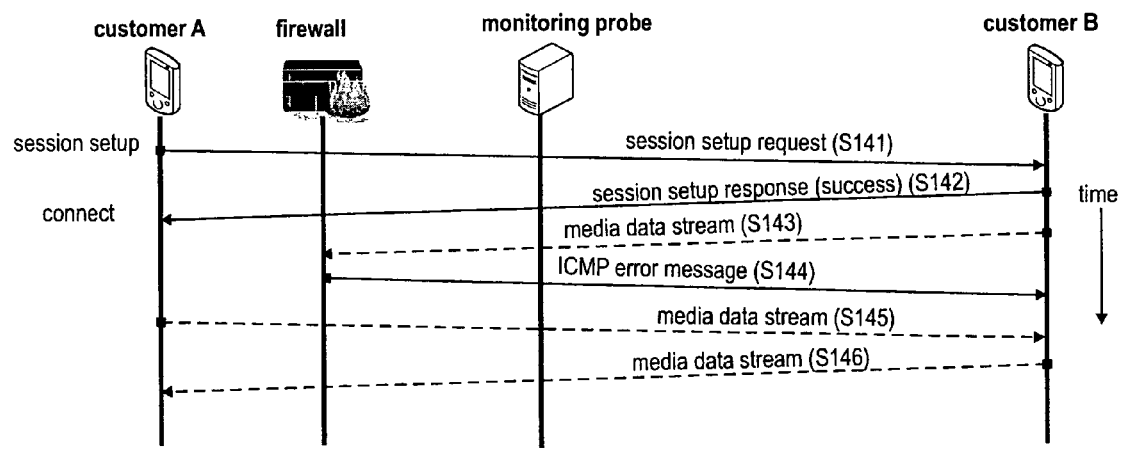
FIG. 14 is a signaling diagram illustrating the message exchange for a VoIP session, in which a firewall blocks a media stream according to one particular impairment scenario ("pattern")

In more detail, the following scenario in accordance with FIG. 14 shall be considered to explain the above embodiment in more detail. In this scenario customer A, initiates a VoIP session to customer B. A firewall protects customer A from malicious packets from the outside (the network right of firewall). The firewall does not allow any data to pass from the outside to the inside, unless customer A specifically asked for a hole in the firewall to be opened. Typically, this happens automatically when customer A opens up a new connection from the inside to the outside. The firewall then allows data on the connection to flow from the outside to the inside.

The session setup request message (S141) from customer A to customer B is responded with a session setup response message (S142) by customer B for reporting on the successful connection attempt. While the connection message is still on the way from customer B to customer A, customer B also starts sending media data (S143). The media stream is blocked at the firewall, and thus does not reach the intended recipient, customer A. The firewall informs customer B of this problem by sending an ICMP error message (S144). Customer B thus learns that it cannot reach customer A on this media path at this time.

While the above messaging occurs, customer A also starts sending media to customer B (S145). The media stream passes the firewall from the inside to the outside. The media stream automatically triggers the firewall to open up for responses on the media stream. Customer B receives the media stream, transmitted by customer A, and attempts to reach customer A by sending further media along the new media path used by the media data transmitted by customer A (S146). As the firewall now allows the media to flow from the outside to the inside, the media stream reaches customer A, finally allowing both customers to communicate with each other.

In summary, in the above exemplary scenario of FIG. 14, the ICMP error message(s) indicates that for a certain time frame customer A was not able to receive media from customer B. In other words, customer A could not hear customer B at the beginning of the VoIP session.

The media monitoring probe would receive data packets from customer B and correspondingly open up a new data record in the media plane database, since the VoIP session was just started. The data record thus comprises information on when the media stream started from customer B. The ICMP monitoring probe receives the ICMP error message(s) (S144) transmitted from the firewall, and the ICMP correlation unit successfully associates same with the data record previously established in the media data database for the first media stream (S143). The media monitoring probe will further monitor the media stream (S143) from customer B to customer A, and the ICMP monitoring probe will learn about all the ICMP messages transmitted by the firewall when a data packet of the media stream (S143) is blocked.

The media monitoring probe will also independently monitor the media stream data being transmitted by customer A to customer B (S145), and the media stream (S146) transmitted by customer B to customer A. No further ICMP error messages will be generated for the data packets of the media stream (S146) transmitted from customer B.

By using the corresponding time stamps for all the media streams registered and for the ICMP messages, it is possible to learn why the media stream from customer B was initially blocked and then let through; namely, because the firewall blocked same, but opened up later after the media stream from customer A was transmitted to customer B.

Without taking multiple media streams or signaling information into account the monitoring probe can deduct that the first few seconds of the media stream (S143) were not audible to customer A as indicated by the ICMP error message(s).

Correlation of Signaling Plane and Media Plane

Furthermore, it is also possible to use signaling information for determining the quality of a VoIP session. Therefore, in addition to correlating ICMP messages and media streams, it is also possible to correlate signaling streams with the corresponding media streams, and thus with the ICMP messages as well. In the following, an exemplary embodiment will be presented in which the signaling plane is correlated with the media plane. This however shall not be understood as limiting the scope of the present invention, but rather it should be noted that for the working of the exemplary embodiment of the invention, it suffices to successfully associate the signaling plane ICMP messages with the corresponding media plane and generate a data record for the media plane.

Figure 15:
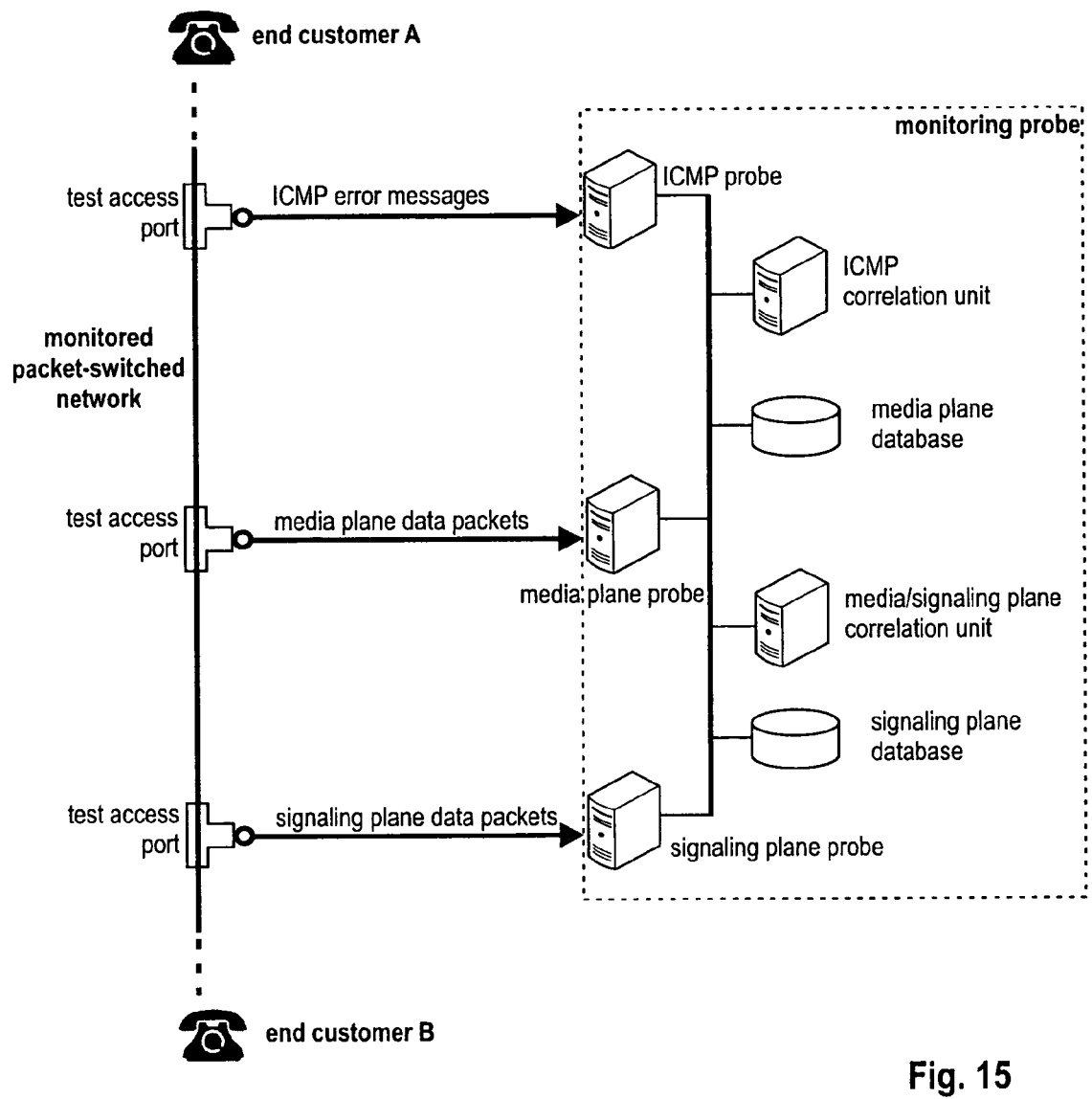
FIG. 15 illustrates the network deployment for the VoIP monitoring probe according to one embodiment of the invention, in which a media plane probe, a signaling plane probe and an ICMP monitoring probe are used to determine the quality of the VoIP session.

FIG. 15 illustrates the network scenario for an embodiment of the invention. As apparent there from and in comparison to the network scenario of FIG. 12, a signaling plane probe, a signaling plane database and a media/signaling plane correlation unit are present in the system. The signaling plane probe observes single signaling packets on the monitored network link. Again, for example a TAP may be used so as to monitor the data packets passing on the network link. On the signaling plane multiple packets belong to one signaling session. The first packet—usually containing a "call setup" message—starts a new session. Packets following the initial packet have to be matched to one of the currently ongoing sessions and session entries managed by the signaling plane probe. Packets which do not start a new signaling session and do not belong to existing sessions may be discarded. In general, matching single packets to existing signaling sessions is specified by the standards which define the signaling protocol itself. Transport layer information, like IP addresses and protocol-specific information (e.g. SIP Call-IDs and tags) may be used in said respect.

Therefore, based on the transport addresses, as well as the protocol-specific information, the signaling plane probe combines the single signaling data packets to form signaling sessions. A corresponding data record for the signaling session is stored within the signaling plane probe itself and/or in a centrally-located database. In the following it is assumed that a central database is located to store signaling related information, as depicted in FIG. 15. Each data record written by the signaling plane probe upon completion of a signaling session contains data which describes the signaling session it monitored.

Signaling data in the signaling plane database includes but is not limited to a set of caller and callee specific properties available per endpoint. The following list is a mere example of information stored in the data record of the signaling plane database, and shall not be understood as limiting the invention.

Endpoint address/name (e.g. SIP URI)
Phone number
User-agent (Endpoint software and version)
capabilities/features
supported media types
IP addresses for signaling and media streams (from SDP body)
Signaling routing information Additionally, session properties, which are not endpoint-specific, may also be included, such as:

Timestamps: session start, Post-Dial-Delay (PDD), connect time, session end
Session flow (signaling message with timestamps)
Session state (successful, unsuccessful, timed out)
Events during session (media on hold, codec renegotiation, session forking, authentication)

A signaling session may be torn down upon reception of a special packet—call hang-up message, which is specific to the signaling protocol used. Upon reception of this message, the signaling media probe can remove the signaling session from its internal storage, while keeping the signaling data record in the signaling plane database.

In summary, the signaling plane probe monitors signaling plane data packets traversing the network link, combines the signaling plane data packets to form signaling streams and stores signaling-related information for each signaling stream in a corresponding signaling plane database.

An exemplary method for correlating at least one media data path and a signaling session of a service is presented in the European patent application EP 10 015 622.3 filed for the same applicant as the present application, which teaching is incorporated herein by reference. A summary of this exemplary correlation method will be explained in the following.

The correlation of the media streams and signaling streams is achieved by using a key, called a "signaling session identifier". This key is identifying a signaling session, and as it can be assumed that a single media service, e.g. a VoIP service, has one signaling session, the key may be thus also considered to identify the VoIP service. According to one embodiment, the correlation mechanism is based on the signaling plane probe monitoring the signaling plane traffic of services so as to identify new services and associate media data paths of the media plane by detecting their corresponding signaling sessions and determining for each service a signaling session identifier for each signaling session of a given service.

The signaling plane probe registers the signaling sessions and their media data paths at a correlation unit in the network using the signaling session identifier as a key. This allows a media plane probe to query the correlation unit for respective signaling session identifiers that correspond to media data paths detected in the media plane traffic monitored by the media plane probe, thereby establishing the correlation between given media paths and signaling sessions of the services.

The signaling session identifier may be for example implemented as a hash value generated by the signaling plane probe. Registration of the signaling session is achieved by transmitting a registration message from the signaling plane probe to the corresponding correlation unit. The registration message comprises the signaling session identifier of the signaling session and the one or more media data path of the service identified by the signaling plane probe.

The correlation unit receives a correlation request message from a media plane probe in the packet-switched network. The correlation request message indicates the media data path, i.e. transport information for a media stream. The correlation unit determines whether a signaling session of a service for the media data path comprise within the correlation request message is registered, and if so, transmits a correlation response message from the correlation unit to the media plane probe. The correlation response message comprises the determined signaling session identifier of the signaling session associated with the media data path comprises within the correlation request message.

In the embodiment of the present application, the above-mentioned correlation unit could be the media/signaling plane correlation unit. The signaling session identifier, as taught in EP 10 015 622.3 is used to correlate the signaling and media planes. Using this teaching for the present application, this results in that the data records of the signaling plane database and the data records of the media plane database comprise the signaling session identifier, thereby allowing correlating the two data records belonging to the same VoIP service. Furthermore, the ICMP messages may be correlated to the media plane data records, as explained above. Therefore, it is possible to consider the signaling data records, the media data records and the ICMP messages for determining the quality of a VoIP session.

In addition, considering information from the signaling plane facilitates understanding the reason why ICMP error messages have been generated for particular data packets. As explained above, instead of expanding the media plane data record with the ICMP events themselves, it is possible to consider all available information to deduce what kind of network constellation caused the ICMP error message.

In said respect, some scenarios are presented where ICMP error messages are generated for different reasons, and where information from the ICMP error messages, the media plane and optionally the signaling allows determining why the corresponding data packet (causing the ICMP error message to be generated) could not be further processed correctly.

Figure 16:
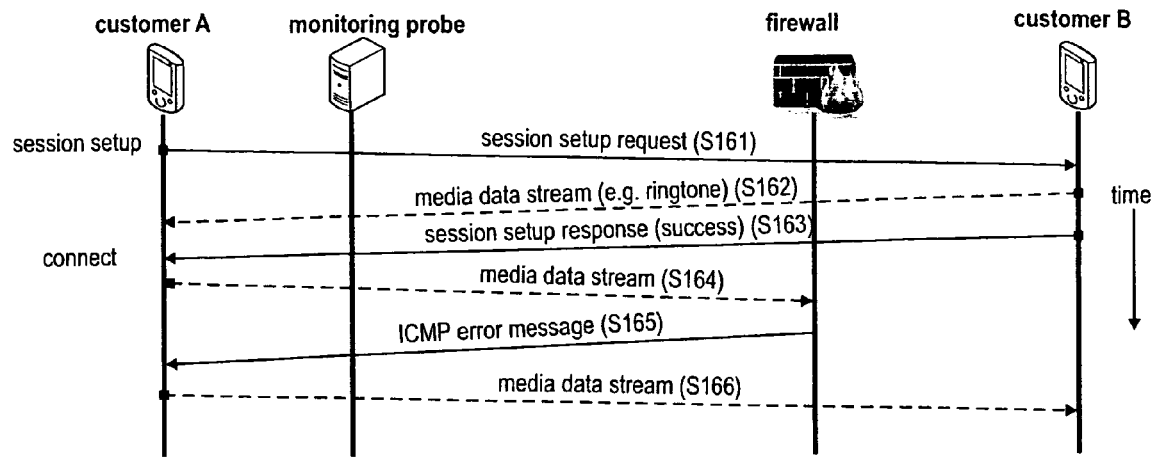
FIG. 16-21 are signaling diagrams illustrating the message exchange for VoIP sessions, in which a firewall blocks particular data packets of a media stream according to several different failure scenarios ("patterns")

FIG. 16 is a signaling diagram illustrating the signaling and media exchange between two end customers. In VoIP communication, endpoints may be reachable over multiple paths, and may have multiple addresses on a single transport protocol (i.e. IPv4 addresses and ports) or support multiple transport protocols (i.e. IPv4 and IPv6). Endpoints can actively notify their remote partners of these possible communication paths, wherein a common method to carry this information is called ICE (Information and Content Exchange).

Additionally, endpoints may guess additional ways to reach other endpoints. The exact mechanism to do this is out of scope of this application, but in general, endpoints can deduct possible communication paths from the signaling and media packets already received. The scenario of FIG. 16 is a scenario in which endpoint A sets up a session with endpoint B, and at first encounters a problem reaching endpoint B on the media plane. In between the two endpoints sits a firewall device.

Endpoint A transmits the initial session setup message (S161) to endpoint B. Upon reception of this message, endpoint B starts sending media packets as a media stream (S162) to endpoint A. Typically, this media stream (S162) contains a ring-tone or some other type of so-called early media (e.g. rate announcement). After an undefined amount of time, the VoIP application at endpoint B fully establishes the session (i.e. picks up the phone) and sends the signaling response (S163) to endpoint A. In this response message (S163) multiple communication paths may be contained. If not, endpoint A may guess additional communication paths upon reception of the message or at a later point during the session.

Endpoint A starts to send media packets as part of media stream (S164) towards endpoint B. This media stream is rejected at the firewall between the two endpoints and thus fails to reach endpoint B. The firewall generates an ICMP error message (S165) and transmits it to endpoint A, informing the endpoint that the stream did not reach endpoint B. At this point, endpoint A chooses another communication path, which it learned earlier, for sending a media stream (S166) to endpoint B. This media stream reaches endpoint B.

From the information stored in the signaling data record, media data record and ICMP message it is possible to deduce that endpoint B did not start to receive any media from endpoint A until endpoint A changed the destination of its media stream from media stream (S164) to media stream (166). Therefore, a corresponding entry can be made in one of the two available databases, preferably in the media data record of the media plane database, to indicate why the error occurred.

Determining a Matching Impairment Pattern

The step of determining the cause of the error based on all the available information may be performed by a pattern matching entity, which may or may not be collocated with any of the depicted entities in the system of FIG. 15, such as the ICMP correlation unit or the media/signaling correlation unit. The pattern matching entity can also be implemented in the embodiment according to FIG. 12. The responsible entity needs to have access to all necessary information, e.g. the signaling data records, the media data records and the information from the ICMP error message(s), in addition to a pattern database as will be described in the following.

The above scenarios of FIGS. 14 and 16 may be described as a series of attributes, such as the sequence and timing of exchanged messages, the time relationship between the media stream(s) and the corresponding signaling streams. The type and order of the ICMP, signaling and media packets define a specific pattern.

Each pattern describes a particular situation in the network which always leads to the same characterizing impairment for the involved parties. A pattern database (not shown in FIG. 12 or 15) is provided in the network, including a plurality of these impairment patterns. The pattern matching entity responsible for deducing the pattern is capable to contact the pattern database to learn which pattern matches the information available for a received ICMP message and the corresponding signaling and media data records. Once an impairment pattern is recognized, the entity may expand the media data record in the media plane database with said pattern, or a corresponding pattern identifier, identifying the matched impairment pattern.

If no impairment pattern matches, the entity may expand the media data record only with information from the ICMP messages itself.

In more detail, each impairment pattern may be described as a sequence of events. An event may have the following exemplary attributes:
  event family (signaling, media, ICMP)
  event family specific event type, e.g.
    ICMP message type (e.g. network unreachable)
    Signaling message type (e.g. call setup, connect)
    Media event (e.g. marker bit)
  timestamp
  destination and thus direction, e.g. from A to B or B to A (deducted from the destination IP address)

It should be noted that the above list of attributes is a mere example, and a skilled person is able to define an impairment pattern using one of the above attributes and/or further attributes.

A monitored VoIP session may be characterized by attributes similar to the above mentioned pattern attributes. A VoIP session contains signaling, media and ICMP events in the corresponding data records of the respective database (xDR entries). From the VoIP session information a pattern matching entity, which in this example case is assumed to be the ICMP monitoring unit, may create a "session pattern" by ordering all events based on the reception timestamp.

The pattern matching entity contains or has access to the pattern database comprising the previously-defined impairment patterns. Some of these impairment patterns will be described with reference to FIG. 16-21. The pattern matching entity compares the specific session pattern against the database of previously configured impairment patterns. A VoIP session matches a specific impairment pattern if the session pattern matches the impairment pattern.

A session pattern always contains specific information, e.g. the signaling message type of a specific event. An impairment pattern in the pattern database may define a specific message type or a list or range of matching message types. This allows defining a more generic impairment pattern which will be matched to a multitude of session pattern by the pattern matching entity.

Figure 17:
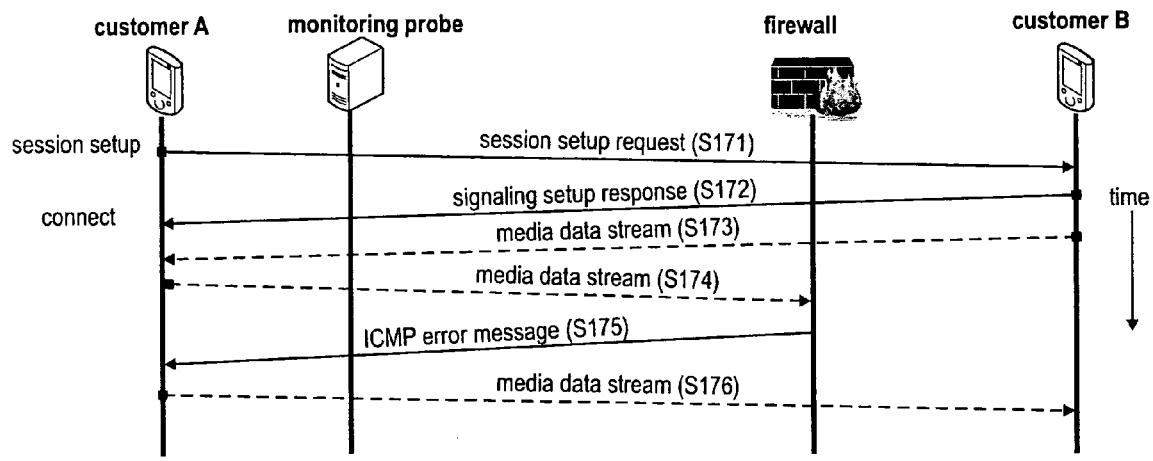

Particular "patterns" will be described in the following. FIG. 17 is similar to the scenario presented in FIG. 16 except for endpoint B immediately responding to the signaling request (S171) with a signaling setup response (S172), before starting to transmit media data (S173). This scenario applies to cases where endpoint B is a computerized endpoint (e.g. a voice-mailbox).

Other patterns will be described in connection with the Real-time Transport Control Protocol (RTCP), which augments the RTP protocol used for transport of media streams across IP-based networks. RTCP packets, so called reports, may be generated periodically by all destinations of RTP media streams and sent to the source of the RTP stream (named receiver reports (RR) in RFC3550). Besides transport-level identifiers to match an RTCP report to an existing RTP stream, the report contains feedback on the quality of the RTP stream. Based on this feedback the source of the RTP stream may change its properties, e.g. change the bandwidth of the stream to counter some congestion effects.

RTP stream destinations typically also transmit RTP streams to allow bidirectional (or multi-directional) conversations. Endpoints acting as transmitter of RTP streams may generate sender reports (SR) which characterize the RTP stream it sends. To reduce the network traffic, an RTP transmitter may merge the receiver report (RR) information into the sender report (SR).

Accordingly most endpoints will generate RTCP SR messages which also contain RR information. Endpoints which only receive RTP streams but do not transmit RTP streams may generate RR messages.

The RTP and RTCP standard (RFC3550) defines that for transport over IP based networks RTCP uses a port different from the RTP port. RTP should use even ports whereas RTCP should use the next higher odd port. Endpoints involved in a VoIP session thus only need to exchange information about the RTP protocol and can then rely on the fact that the next odd port will be used for RTCP.

In VoIP session scenarios which involve some sort of firewall this leads to the problem that the firewall has to open up the ports to allow RTCP traffic to pass if RTP traffic has been observed by the firewall. Often however, firewalls are not aware of the presence of RTCP and thus reject RTCP messages, as will be described in connection with the following "patterns" according to FIGS. 18 to 21. In all scenarios endpoint A initiates a session with endpoint B. In between the two endpoints sits a firewall device with the functionality described before. Since the VoIP session is dynamic during the setup and the particular order of the initial packets streams may vary, the patterns of FIGS. 18 to 21 below only contain the information relevant to the pattern. Time-wise before the pattern begins, endpoint A and endpoint B establish a VoIP session and are sending each other data as the media streams.

Figure 18:
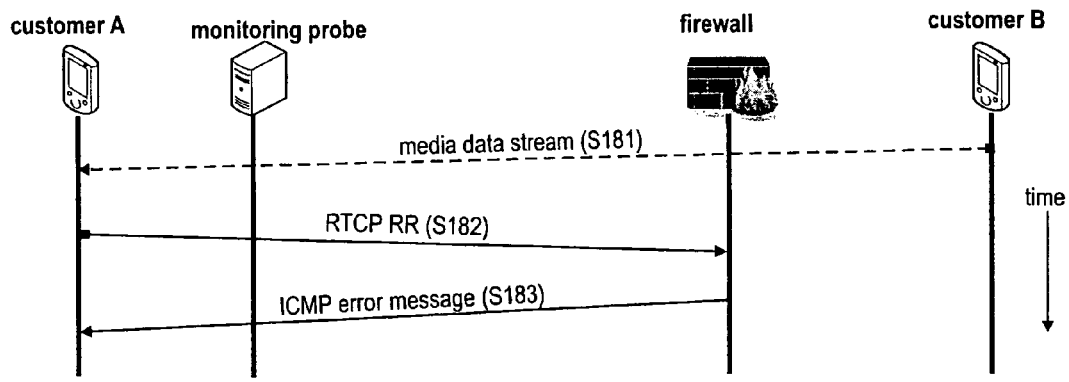

In the scenario of FIG. 18 endpoint A generates a "receiver report" with quality information about the media stream (S181) received from endpoint B. Endpoint A transmits the RTCP RR (S182) to endpoint B. However, an intermediary firewall device prevents the RTCP RR message (S182) from arriving at endpoint B and informs endpoint A about this using an ICMP error message (S183).

From this pattern a VoIP monitoring solution can deduct that endpoint B did not receive the RTCP RR (182) message and thus does not have the information about the stream quality which endpoint A compiled. In particular, the media monitoring unit monitors the RTCP messages, and the ICMP monitoring unit receives the corresponding ICMP messages, generated because of the blocking of said RTCP messages. If endpoint A experienced quality degradation, it cannot inform endpoint B about this, using the mechanism RTCP provides.

Figure 19:
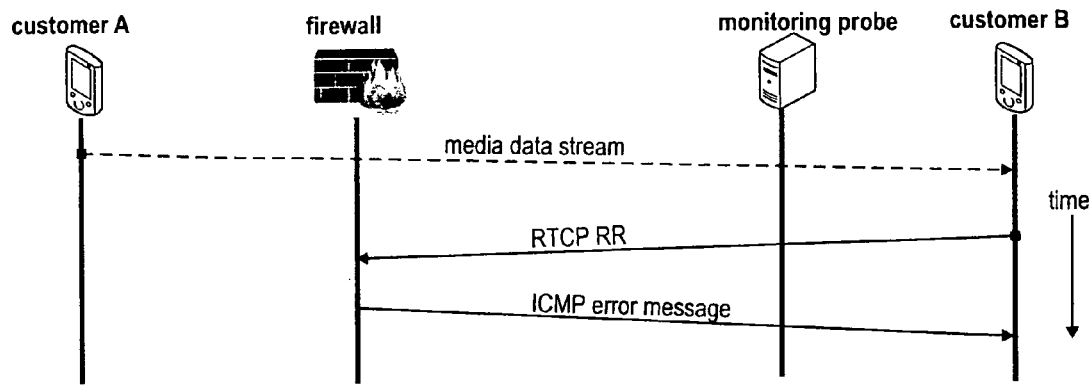

FIG. 19 is basically a counterpart of the scenario illustrated in FIG. 18. Endpoint B attempts to transmit the RTCP RR to endpoint A, but fails due to the intermediary firewall. The firewall device informs endpoint B about the fact that the RTCP RR did not arrive at endpoint A using an ICMP error message. Again, a monitoring probe can determine why the ICMP error message was generated and transmitted, and may deduce that endpoint A did not receive the RTCP error message, and thus does not have the information about the stream quality which endpoint B compiled.

Figure 20:
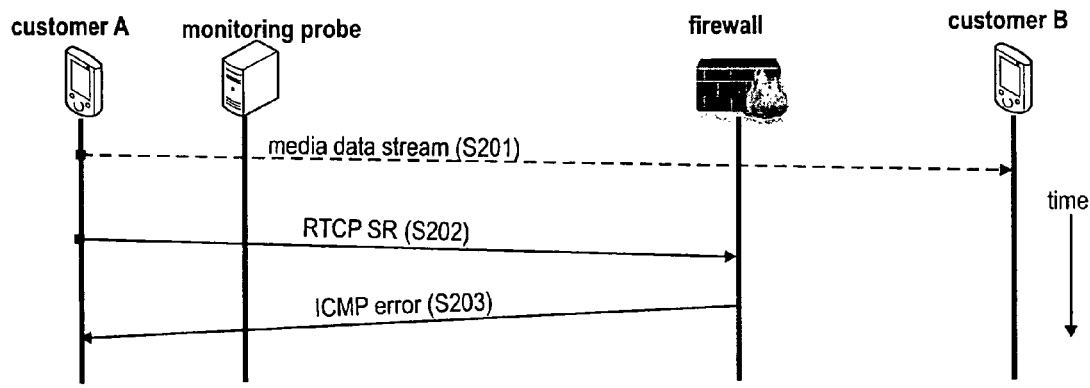

In the pattern of FIG. 20, endpoint A pro-actively reports information about its own media stream to endpoint B. In more detail, endpoint A transmits a media stream (S201) to endpoint B. The matching RTCP Sender Report summarizes the data transmission which happens as media stream (S201), i.e. counting the number of packets sent since the last RTCP SR. This RTCP SR is sent by endpoint A to endpoint B (S202). An intermediary firewall prevents the transport to endpoint B and generates an ICMP error message (S203). Endpoint B thus lacks the information contained in the RTCP SR. From this information, endpoint B could have derived quality-related information about the media (S201) it received.

A VoIP monitoring solution can identify this pattern and record that endpoint B did not receive the RTCP SR which was generated by endpoint A. Endpoint B thus lacks the ability to judge the quality of the media stream.

Figure 21:
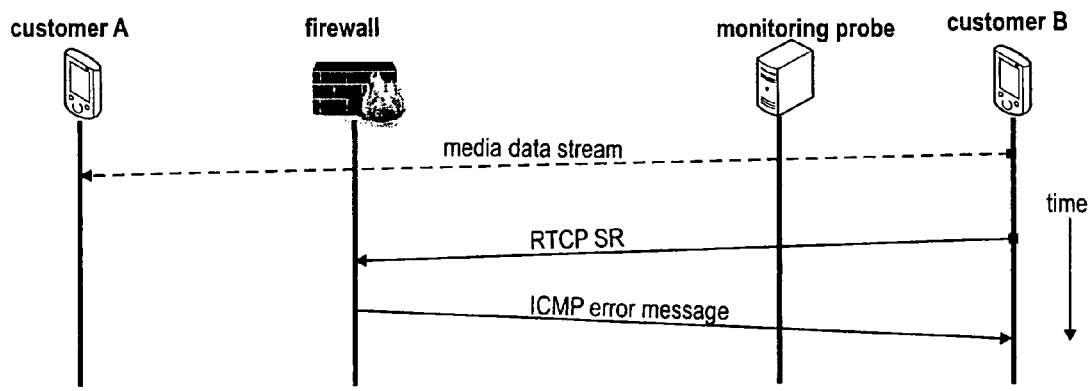

FIG. 21 refers to a scenario which is the reverse to the one presented in connection with FIG. 20. Accordingly, endpoint B transmits the media stream and also generates the RTCP SR containing information about the transmitted media stream. An intermediary firewall blocks the transmission of the RTCP SR from endpoint B to endpoint A, thus preventing endpoint A from evaluating the quality of the media stream utilizing the RTCP SR. As explained above, the VoIP monitoring solution can identify this pattern and record that endpoint A did not receive the RTCP SR which was generated by endpoint B. Endpoint A thus lacks the ability to judge about the quality of the received media stream.

The above-described "patterns" are only examples of possible scenarios that lead to an ICMP error message being generated. A skilled person is able to determine further scenarios and the corresponding pattern attributes so that a monitoring probe is able to deduce the cause and/or consequences of an ICMP error message being generated.

By defining and searching for matching patterns, a VoIP monitoring according to one of the embodiments of the present invention is able to gather additional information about the VoIP session quality perceived by the endpoints. Also, if the ICMP events (information within the ICMP error message) are used as well, it is possible to have a better understanding of the VoIP quality than by using RTP media streams alone.

Note that any firewall or intermediary device may send multiple ICMP messages for the same issue. A device typically generates an ICMP error message for each blocked or erroneous packet. RTP streams (and other applications) typically contain 50 packets per second and would thus cause 50 ICMP messages to be generated. To prevent a flood of ICMP messages firewalls and other network devices have product-specific rate-limiting mechanisms implemented which significantly reduce the number of ICMP messages generated per incident. The implementation and parameters of these mechanisms are out of the scope of this application. To summarize, the pattern expects at least one ICMP message to be received and will absorb the following ICMP messages for the same incident.

Utilizing the monitoring solution according to one of the embodiments of the present invention cannot guarantee the arrival and processing of the data at the endpoint, but it may reciprocally detect a delivery failure. By processing ICMP error message, it can report transport problems of media packets (both RTP and RTCP) between endpoints. By using the sessions patterns as exemplary presented above, the VoIP monitoring solution can further analyze and characterize the problem in terms of what media information got lost in what part of the VoIP session and for what reason.

In the following, the different logically distinct units of the monitoring probe will be presented in more detail. It should be kept in mind, that the various units may or may not be collocated, and/or may or may not share hardware/software.

Media Plane Monitoring Unit

Figure 22:
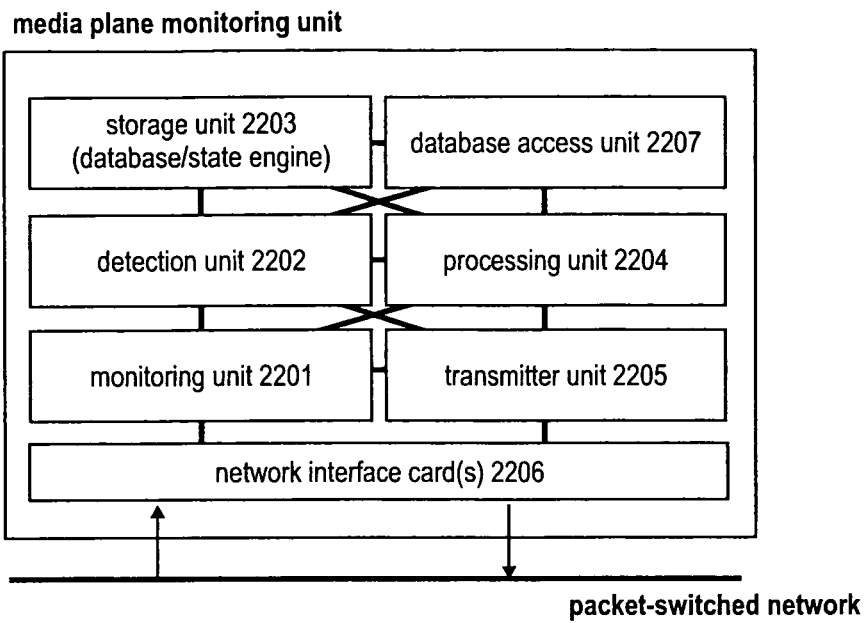
FIG. 22 shows the structure of a media plane monitoring unit according to an embodiment of the invention.
Figure 23:
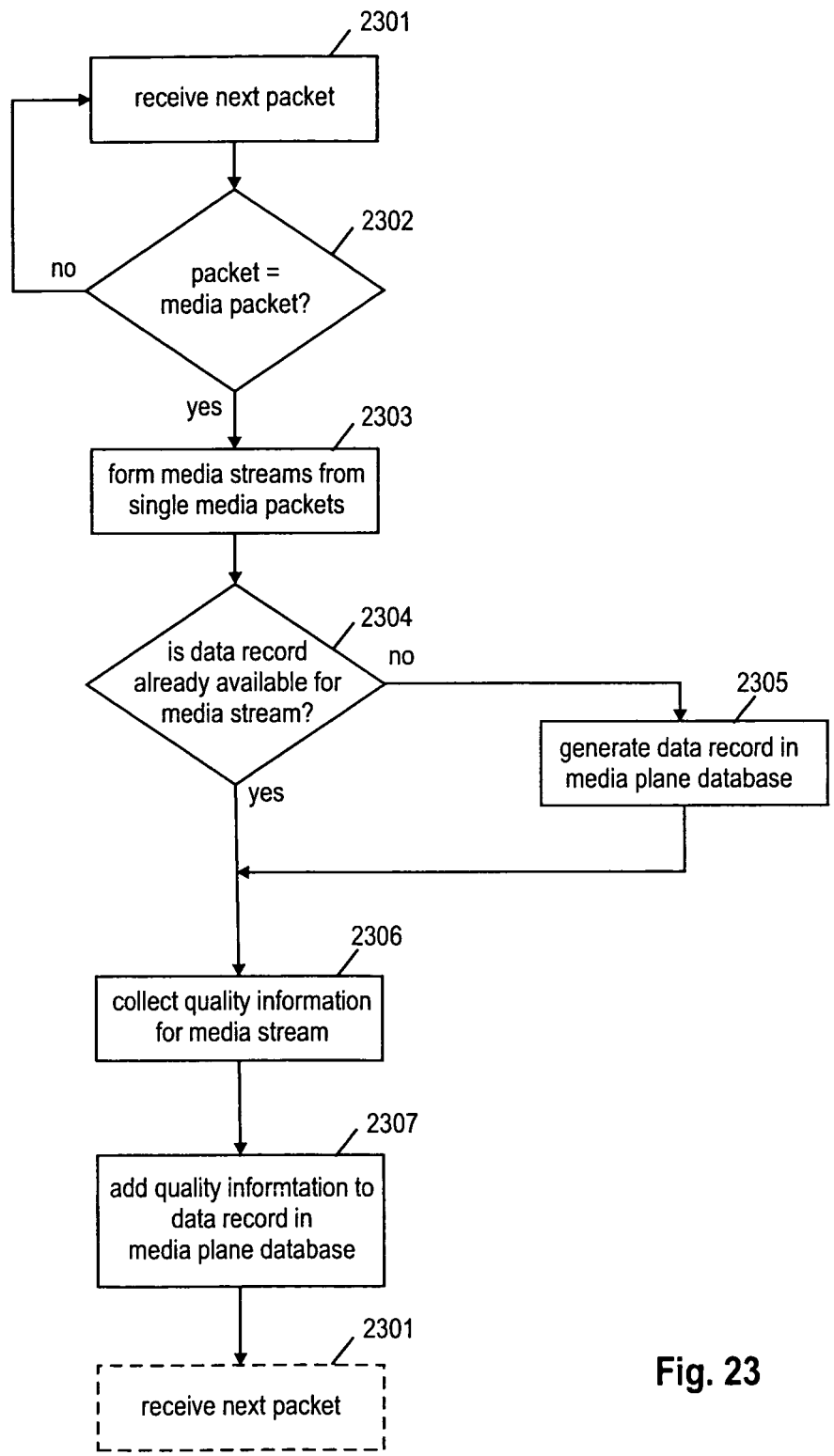
FIG. 23 is an exemplary flow chart of the operation of the media plane monitoring unit according to an embodiment of the invention.

Next, the media plane probe according to an exemplary embodiment of the invention is described with respect to FIG. 22 and FIG. 23. FIG. 22 shows an exemplary embodiment of a media plane monitoring unit, while FIG. 23 shows a flow chart of its exemplary operation according to an embodiment of the invention.

The media plane monitoring unit may observe one or more network links to obtain a copy of all packets passing these interfaces. The media plane probe comprises a monitoring unit 2201 that receives 2301 packets of a service on the packet-switched network. For example, this monitoring unit 2201 receives the packets from one or more specialized packet capture cards 2206 (network interface card—NIC) which are capable of receiving and processing packets on the physical interface and to provide them to the application layer, nearly without requiring CPU processing time and operation system functionality. An optional filter in the packet capture card of the media plane probe may be used to prevent unwanted packets from being copied from the network interfaces to the processing processes. This filter may be for example implemented as stateless or stateful Internet Protocol (IP) or payload filter. For example, this filter may further check 2302, whether the currently processed packet is a media plane packet (media packet) or is some other packet. If the packet does not belong to the media plane, i.e. is not packet of a media related protocol, such as for example RTP, the next packet may be processed.

Each media packet received will be processed by the media plane monitoring unit. The detection unit 2202 of the media plane probe is designed to detect and form 2303 media streams from single media packets. The media plane probe may further comprise a processing unit 2204 that may hold a state table which stores information about the media streams monitored by the media plane probe in a local storage unit 2203, e.g. a volatile memory. Based on the protocol-specific identifiers in the media streams, the media plane probe (e.g. based on header information in the RTP packets and/or lower layer headers) the detection unit 2202 identifies a received packet as the start of a new media stream (having a given media data path) or appends the new packet to an existing media stream (i.e. media data path). The media streams or, better, the media paths thereof are for example indicated by an IP address and port tuple of the destination device, i.e. the receiving device of the media stream.

The media plane probe's processing unit 2204 stores information describing the state of the detected media streams in the state table. Furthermore, the media plane monitoring unit has a database access unit 2207 to access the database in the storage unit or a centrally-located database outside of the media plane monitoring unit. The media plane database keeps a data record for every media stream, and the media monitoring unit checks 2304 whether a data record is available in the media plane database for said particular media stream. If no data record exists, the processing unit 2204 in connection with the database access unit 2207 generates 2305 an appropriate data record. The information record stored in the database may for example comprise time-stamps of start- and (later on) end-time of the media stream(s) and information about the endpoints (e.g. IP address and port tuples) involved in the media service.

While receiving the media data packets, the media plane monitoring unit collects 2306 quality information for the media stream and stores 2307 said quality information in the data record of the media plane database as described above. The data record in the media plane database is thus kept updated with regard to the quality of the media stream.

Please note that in case the media plane probe should perform passive non-intrusive monitoring of the signaling plane traffic, respectively media plane traffic, a separate network interlace card is employed for the transmission of correlation related messages (i.e. the network interlace card(s) for monitoring the traffic are only employed for packet reception but not for packet transmission).

In a further example embodiment of the invention, the media plane probe's processing unit 2204 may periodically (e.g. every 5 seconds) check all entries in the state table in order to identify and process media streams that have ended. For this purpose, the media plane probe may also consider timestamps indicating the last update of the respective state table entries. A media stream may be for example considered terminated, if no new media packets have been received by the monitoring unit 2201 for the existing media stream for a given amount of time (e.g. 60 seconds). The media plane probe deletes the media stream from the state table.

If a hash value calculated from the SSRC and media path information of the media stream is used for the ICMP/media correlation, the data record of the media stream may be further expanded by first calculating the hash value and adding the calculated hash value to the data record. Since this is only one of the possible embodiments, no corresponding step(s) has been added to the flow chart of FIG. 23.

It should be noted however that the ICMP/media correlation using a hash value involves more processing than a simple IP and/or port or SSRC binary comparison. A binary search in the database might be implemented as a binary tree.

ICMP Monitoring Unit

Figure 24:
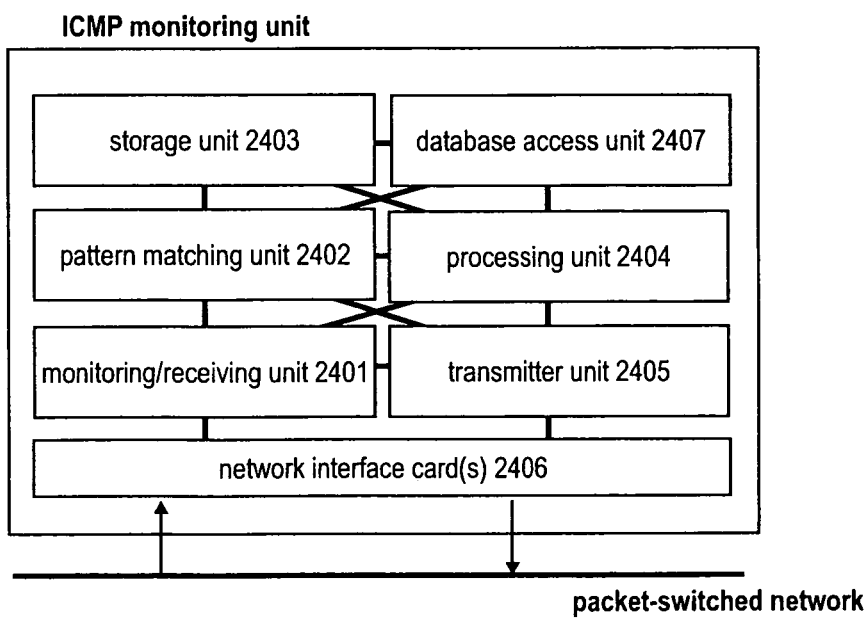
FIG. 24 shows the structure of an ICMP monitoring unit according to an embodiment of the invention.
Figure 25:
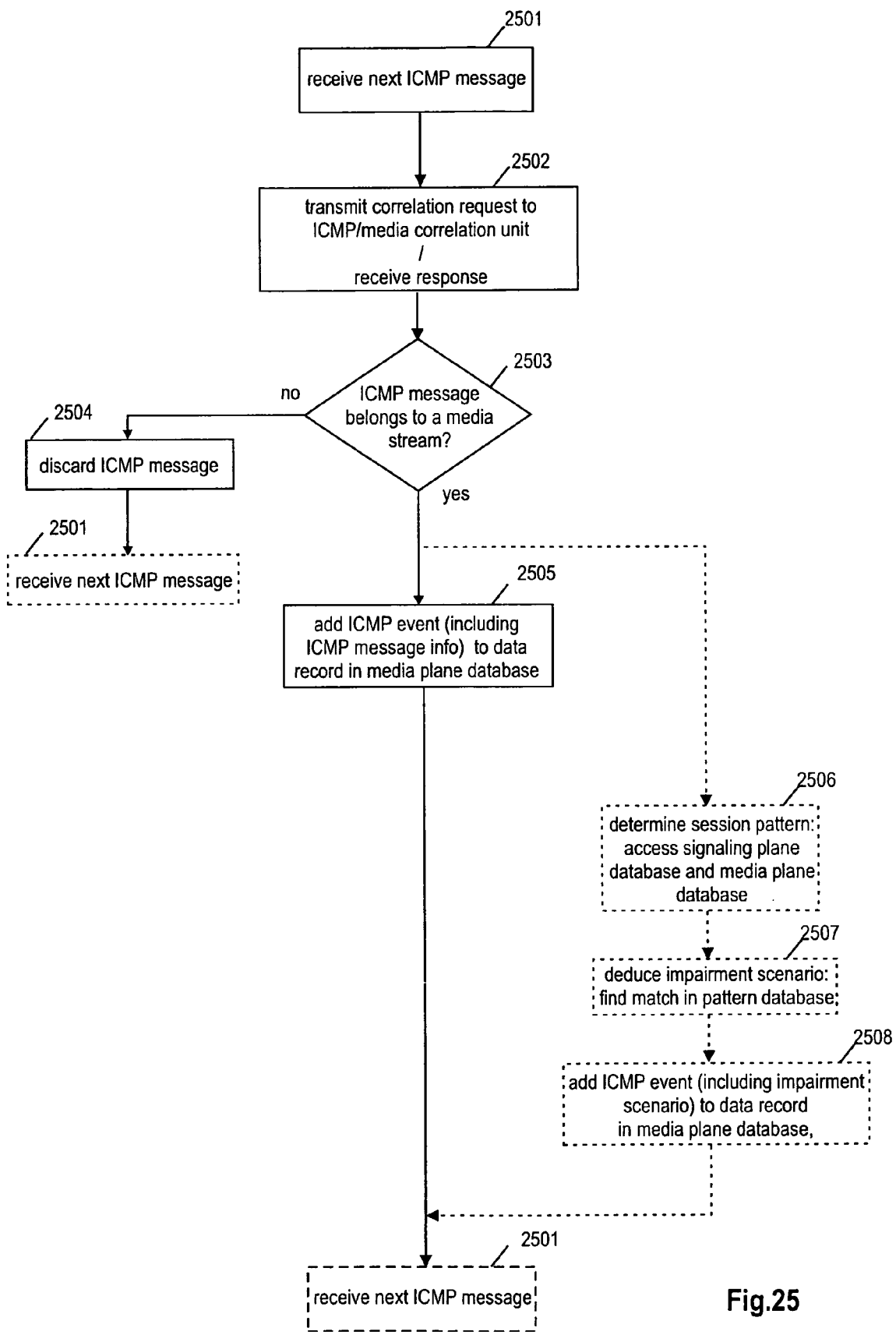
FIG. 25 is an exemplary flow chart of the operation of the ICMP monitoring unit according to an embodiment of the invention.

Next, the ICMP monitoring unit according to an exemplary embodiment of the invention is described with respect to FIG. 24 and FIG. 25. FIG. 24 shows an exemplary embodiment of an ICMP monitoring unit, while FIG. 25 shows a flow chart of its exemplary operation according to an embodiment of the invention.

In general, the ICMP monitoring unit observes one or more network links to obtain a copy of all packets passing these network links/interfaces. For this purpose, the ICMP monitoring unit comprises a monitoring unit 2401 that receives 2501 packets of a service on the packet-switched network. For example, this monitoring unit 2401 may receive the packets from one or more specialized packet capture cards 2406 (network interface card—NIC) in the same or similar way as the media plane monitoring unit explained before. Again, an optional filter in each packet capture card of the ICMP monitoring unit may be used to prevent unwanted packets from being copied from the network interfaces to the processing processes. For example, this filter may ensure that only ICMP messages are provided to the ICMP monitoring unit.

The processing unit 2404 of the ICMP monitoring unit then prepares a correlation request message and transmits 2502 same to the ICMP/media correlation unit using the transmitter unit 2405. The correlation request message comprises the necessary information so that the ICMP/media correlation unit can perform the correlation. The content of the correlation request message relates to the ICMP message and partly depends on the particular implementation and on the protocols used for transmission of the media stream which data packet caused the ICMP message to be generated. For instance, if RTP is used, the ICMP messages and the data packets of the media stream comprise the SSRC which can be included in the correlation request message to the ICMP/media correlation unit. The correlation request message always comprises the media data path, i.e. destination/source addresses and ports.

In response thereto, the receiving unit 2401 of the ICMP monitoring unit receives (S2502) a response message from the ICMP correlation unit. The response message includes information on whether the ICMP message is related to any ongoing VoIP session, i.e. media stream, or not. Correspondingly, the processing unit 2404 analyzes the response message and thus determines 2503 whether the received ICMP message belongs to a media stream, which was already monitored by the media plane monitoring unit. If no match is indicated in the response message, the ICMP message is discarded 2504, and the ICMP monitoring unit waits for the next ICMP message to be processed.

In case the response message received from the ICMP/media correlation unit indicates a matching media stream, the database access unit 2407 provides access to an internal database in the storage unit 2403 and/or to the centrally-located media plane database to add 2505 an ICMP event to the data record of the corresponding media stream (as indicated in the response message). As explained before, the ICMP event may include information such as the type and code from the ICMP header of the ICMP message, etc.

In addition or as an alternative, it is possible to add more information to the data record in the media plane database as explained in the following with reference to the dashed lines in FIG. 25. In other words, steps 2506-2508 are entirely optional in the exemplary embodiment of FIG. 25. With regards to this, a pattern matching unit 2402 of the ICMP monitoring unit may access the media plane database, and if applicable the signaling plane database, in order to determine 2506 the attributes of the error scenario for the received ICMP message so as to define a session pattern. Using the database access unit 2407, the pattern matching unit 2402 may access the pattern database in order to find 2507 a match of an impairment pattern scenario to which the currently received ICMP message applies, based on the determined attributes of the session pattern. Once a matching impairment scenario pattern is found, corresponding information is added 2508 to the data record of the corresponding media stream in the media plane database.

ICMP/Media Correlation Unit

Figure 26:
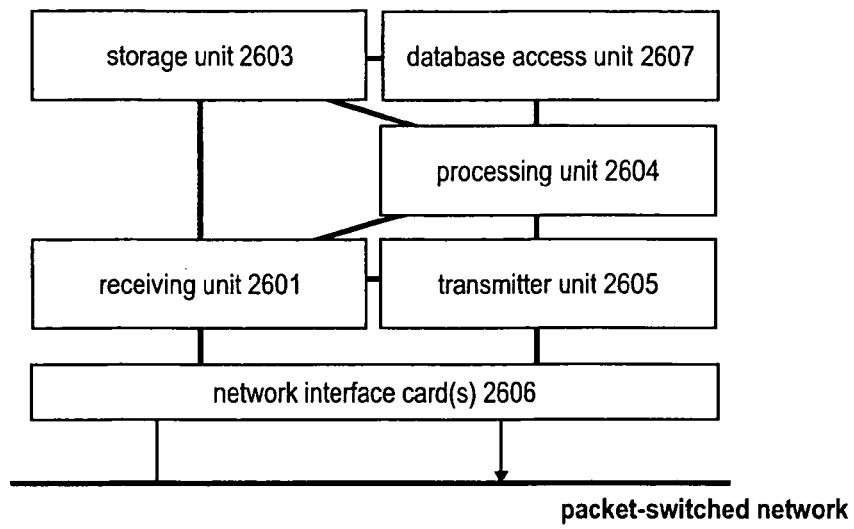
FIG. 26 shows the structure of an ICMP/media correlation unit according to an embodiment of the invention.
Figure 27:
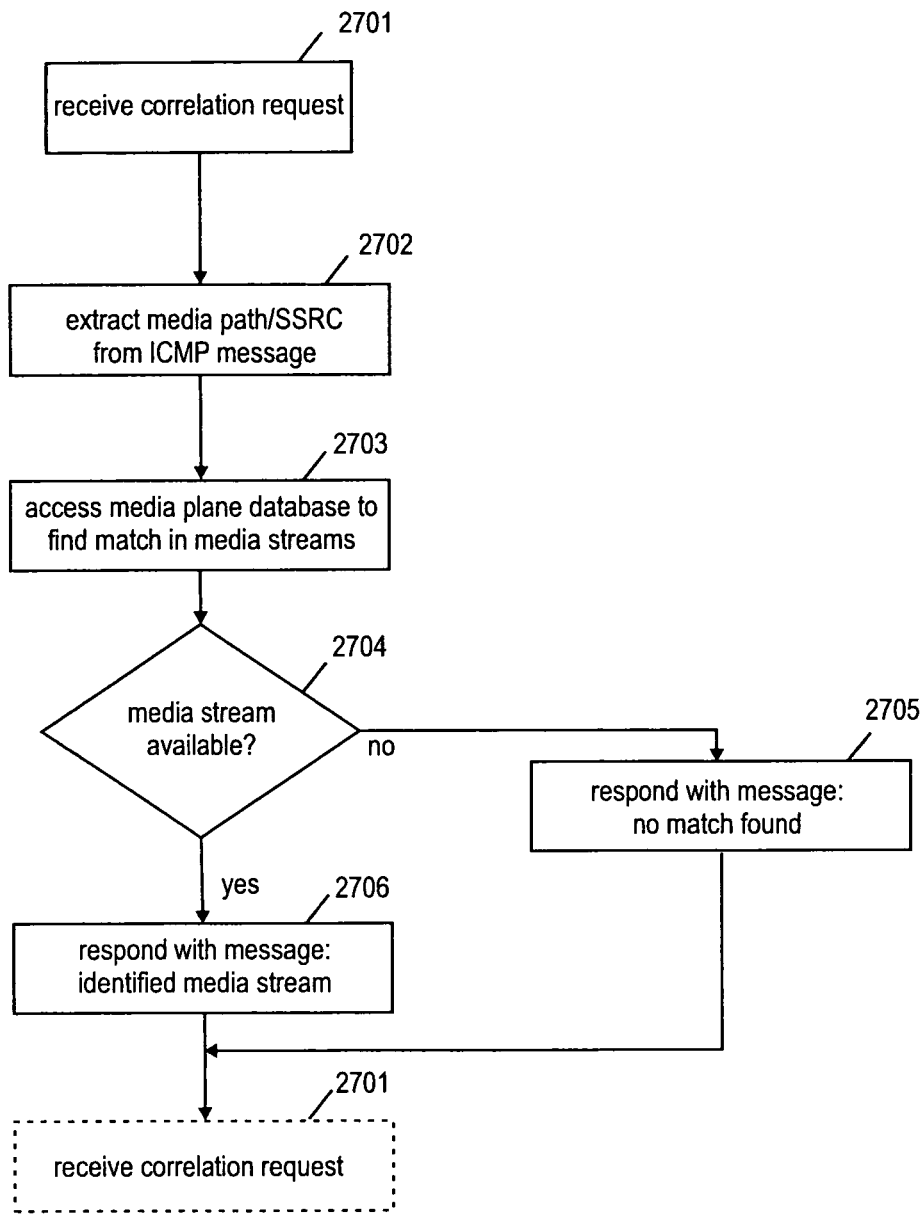
FIG. 27 is an exemplary flow chart of the operation of the ICMP/media correlation unit according to an embodiment of the invention.

Next, the ICMP/media correlation unit according to an exemplary embodiment of the invention is described with respect to FIG. 26 and FIG. 27. FIG. 26 shows an exemplary embodiment of the ICMP/media correlation unit, while FIG. 27 shows a flow chart of its exemplary operation according to an embodiment of the invention. The ICMP/media correlation unit is reachable via the packet-switched network, and may comprise for said purpose one or more network interface cards 2606.

The ICMP/media correlation unit provides the ICMP monitoring unit with information on whether a received ICMP message belongs to media stream that is being monitored by the media plane monitoring unit. In order to provide said function, the ICMP/media correlation unit comprises a receiving unit 2601 for receiving 2701 correlation request messages transmitted from the ICMP monitoring unit. The receiving unit 2601 receives these correlation request messages from the network interface card(s). A processing unit 2604 of the ICMP/media correlation unit analyzes the correlation request message and extracts 2702 the information included therein. This information may be the media path and optionally the media stream SSRC contained in the ICMP message.

A database access unit 2607 allows accessing the media plane database and in connection with the processing unit 2604 to find a match in all the registered media streams to the given media path and/or SSRC. As explained above, the correlation as such is performed on the media path information and optionally on the SSRC information if available. To cover all embodiments, the flow chart of FIG. 27 does not detail the particular steps to find the match in the media stream.

If 2704 no matching media stream is determined in the data records of the media plane database, a response message is prepared including an indication that no match is found for the ICMP message. The transmitter unit 2605 transmits 2705 the response message to the ICMP monitoring unit.

If 2704 a media stream is found in the data records of the media plane database corresponding to the ICMP message, a corresponding response message is prepared, including the necessary information on the matching media stream. The response message is then transmitted 2706 to the ICMP monitoring unit, using the transmitter unit 2605 of the ICMP/media correlation unit.

A particular embodiment of the invention may include an ICMP/media correlation unit co-located with the media plane probe and the ICMP monitoring unit. In this case, the responses according to steps 2705 and 2706 may not be sent from the transmitter unit 2605, but may be internally exchanged between the ICMP/correlation unit and the ICMP monitoring unit.

Signaling Plane Monitoring Unit

Figure 28:
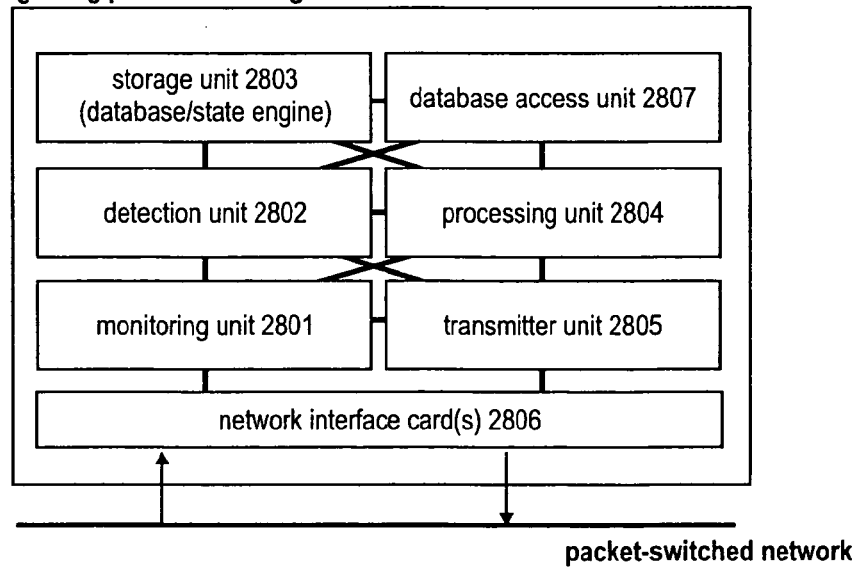
FIG. 28 shows the structure of a signaling plane monitoring unit according to an embodiment of the invention.
Figure 29:
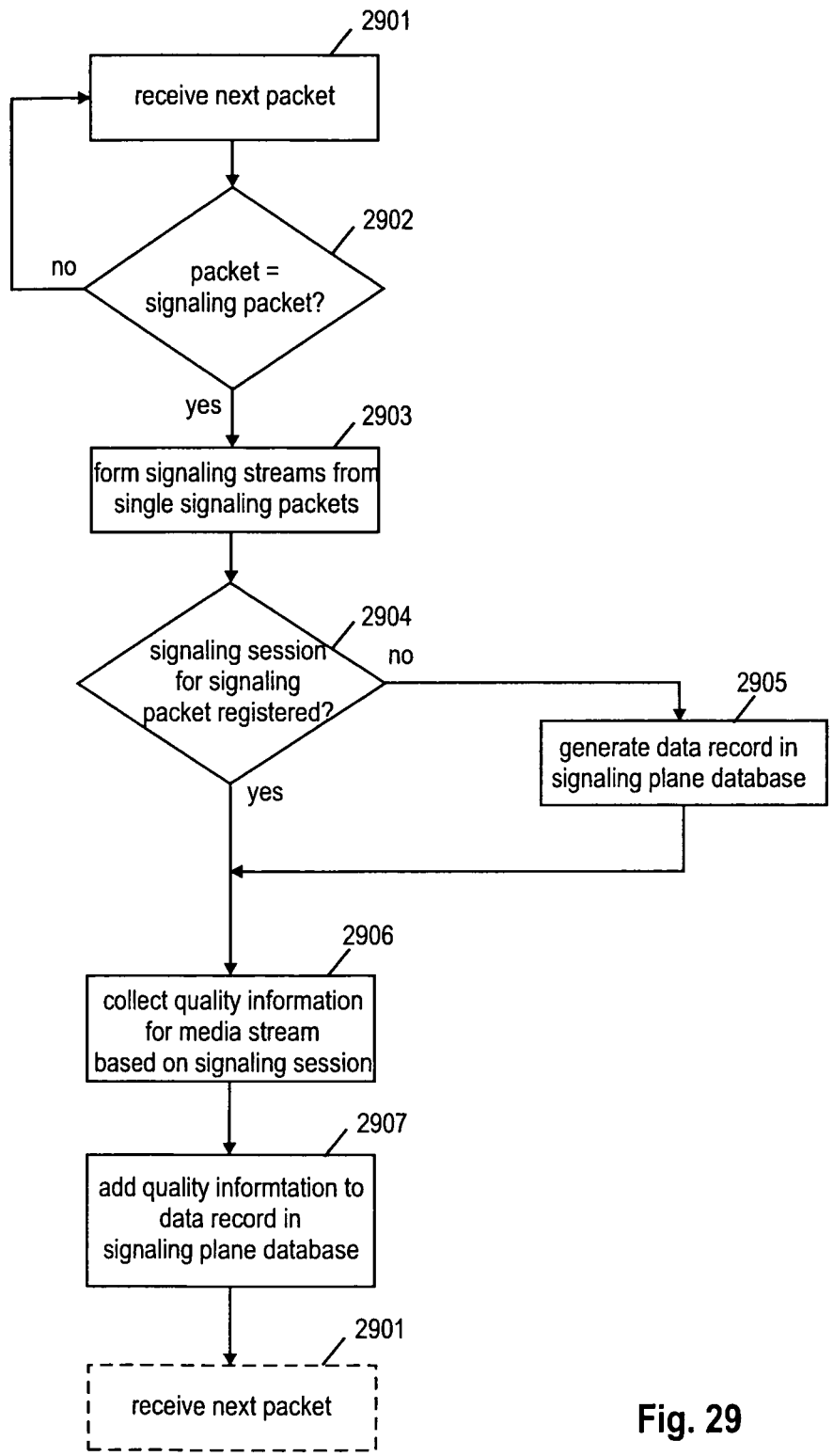
FIG. 29 is an exemplary flow chart of the operation of the signaling plane monitoring unit according to an embodiment of the invention.

Next, the signaling plane monitoring unit according to an exemplary embodiment of the invention is described with respect to FIG. 28 and FIG. 29. FIG. 28 shows an exemplary embodiment of the signaling plane monitoring unit, while FIG. 29 shows a flow chart of its exemplary operation according to an embodiment of the invention.

In general, the signaling plane monitoring unit observes one or more network links to obtain a copy of all packets passing these network links/interfaces. For this purpose, the signaling plane monitoring unit comprises a monitoring unit 2801 that receives 2901 packets of a service on the packet-switched network. For example, this monitoring unit 2801 may receive the packets from a one or more specialized packet capture cards 2806 (network interface card—NIC) which is capable of receiving and processing packets on the physical interface and to provide them to the application layer, nearly without requiring CPU processing time and operation system functionality. An optional filter in each packet capture card of the signaling plane monitoring unit may be used to prevent unwanted packets from being copied from the network interfaces to the processing processes. These filters may be for example implemented as stateless or stateful Internet Protocol (IP) or payload filters. For example, this filter may check 2902, whether the currently processed packet is a signaling packet or not. If the packet does not belong to a signaling session, i.e. is not packet of a signaling related protocol, the next packet may be processed.

Each signaling packet received at the signaling plane monitoring unit will be processed by a detection unit 2802 which analyzes the contents of the packets provided by the monitoring unit 2801 so as to identify and process packets as signaling packets. Specifically, the detection unit 2802 detects signaling packets and matches these to signaling sessions of the media service, and is capable of identifying one or more media data paths of a media plane of the service based on signaling information of the service comprised in the received packets. Please note that the detection unit 2802 may be provided in one or more specialized packet capture card.

For example, packets containing signaling information (signaling packets) are identified by the detection unit 2802 in a parsing process based on their header information. If parsed successfully as a signaling packet, the signaling packet is forwarded to a state engine. The state engine is designed to identify 2903 and form signaling sessions from individual signaling packets.

The state engine (which may be considered an internal database with correlation related information maintained in the storage unit 2803) has a processing facility and a state table which holds information about signaling sessions. Based on the protocol-specific identifiers in the signaling packets in the packet headers, the detection unit 2802 can identify the start of a new signaling session or append a respective processed signaling packet to an existing signaling session. Signaling packets which neither start a new session nor belong to an existing session may be discarded. Depending on whether the identified signaling session is already registered in the signaling plane monitoring unit (step 2904), the detection unit 2802 may need to generate 2905 a new data record in the signaling plane database. As explained in previous embodiments of the invention (see explanation in connection with EP 10 015 622.3), a signaling session identifier may be used to correlate the signaling and media plane. If said is the case, a new signaling session identifier can be generated in response to the detection of a new signaling session by the detection unit 2805. The signaling session identifier may be for example a hash value. The state table could then use the signaling session identifier value as unique key to identify a specific signaling session.

The signaling plane monitoring unit may further comprise a storage unit 2803, e.g. a volatile memory, to store the information describing the state of the respective signaling sessions in the state table. In particular, the processing unit 2804 may determine and collect 2906 quality-related information from the signaling message(s). Using the database access unit 2807, the processing unit 2804 may access the signaling plane database to store 2907 the collected information in the corresponding data record for the signaling session.

The signaling to media correlation unit is not depicted and will only be explained in short, while referring to European patent application EP 10 015 622.3 for further details of one possible implementation as to how a correlation of the signaling and media plane can be achieved. The signaling session identifier is used to find a data record entry in the media plane database corresponding to the signaling session. The media plane database has been enriched with signaling session identifiers as part of the above mentioned patent application.

Figure 4:
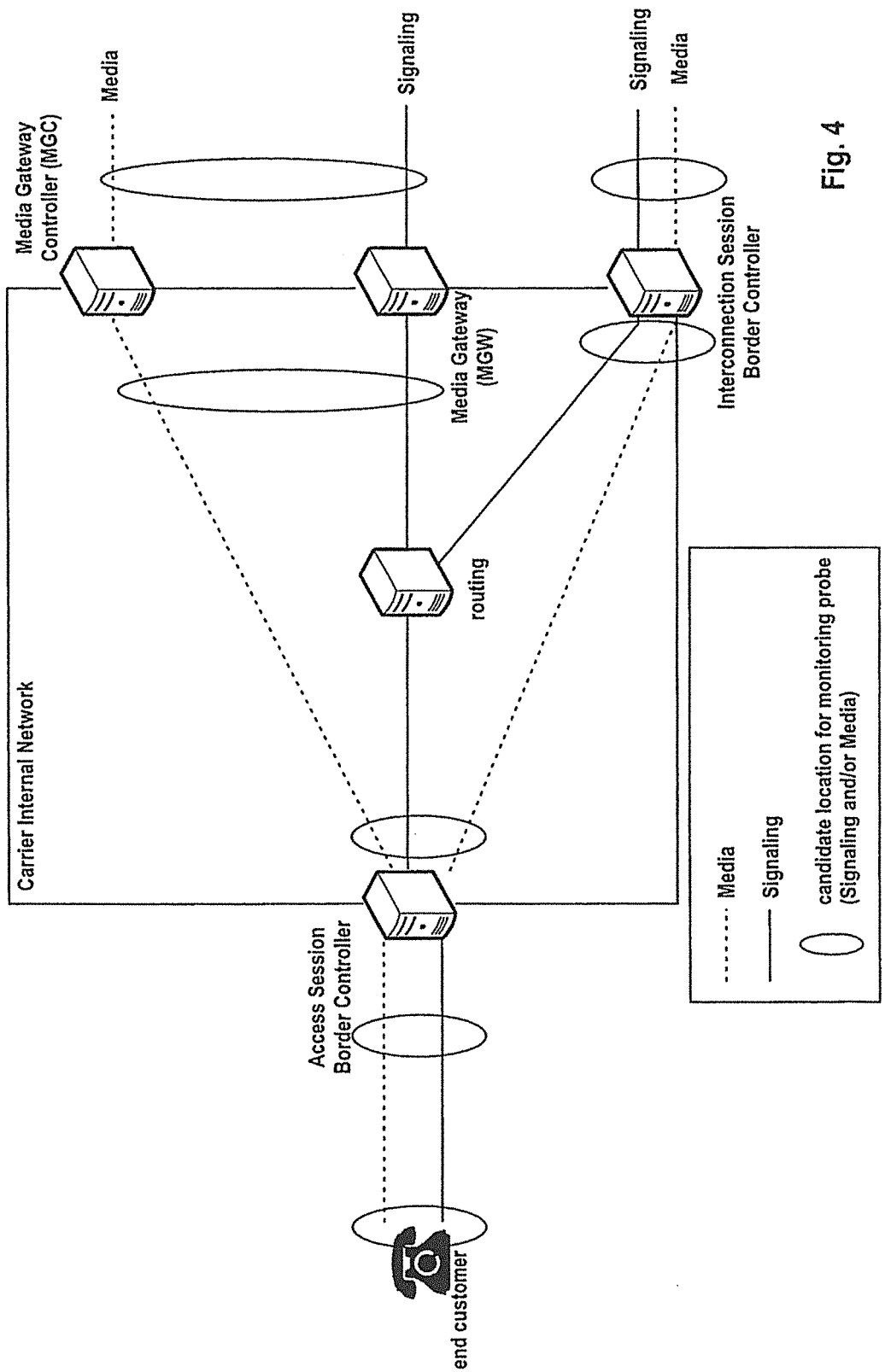
FIG. 4 shows a network in which locations are indicated, where signaling and/or media plane probes of the invention may be advantageously located according to an embodiment of the invention.

FIG. 4 shows a simplified network in which locations are indicated where ICMP/media correlation may be desired and can be implemented using the mechanism according to one of the various embodiments described herein. Possible monitoring locations are for example (and not limited thereto):

the Access Session Border Controller (SBC) network interfaces with end customers (shown of the left side of FIG. 4), a decomposed gateway system, e.g. to the PSTN, is shown as Media Gateway (MGW) and a Media Gateway Controller (MGC)—see In the top right section of FIG. 4, and an Interconnection SBC interfaces to one or more interconnection or transit partners (see the lower right side of FIG. 4).

It should be noted that the location of the monitoring probes for media plane, ICMP messages and signaling plane may also be subject to a customer's request and requirements on the monitoring solution.

In some cases, the signaling and media plane may originate and/or terminate at the same endpoint (device). In case of an end customer this endpoint most likely uses the same IP address on the signaling and media plane. These streams may be for example observed, if the signaling plane monitoring units and the media plane monitoring units are placed close to the end customer devices. The Access Session Border Controller may be considered to be close to the carrier internal network's "border" towards end customer devices and to therefore receive traffic from the end customers on one side and transmits this traffic on the other side towards the carrier internal network. Most commonly, these Session Border Controllers (SBC) are used to separate the devices outside the own trust domain from the inside network. Although the traffic is in one geographic location the SBC may use different IP addresses to load balance traffic. In this case, a simple IP address based correlation mechanism not using the principles and ideas outlined herein would already fail whereas the correlation mechanism described herein would succeed. The signaling plane monitoring units and media plane monitoring units may be for example placed in a way that they observe the signaling streams and media streams respectively.

The terms probe, monitoring unit and correlation unit used herein can be considered to refer to dedicated hardware, a software program or a combination thereof to implement the desired functionality. Accordingly, another embodiment of the invention relates to the implementation of the above described various embodiments using hardware and software. It is recognized that probes and units of the invention may be implemented by having computing devices (processors) execute a software program that causes the desired functionality being executed. A computing device or processor may for example be general purpose processors, digital signal processors (DSP), application specific integrated circuits (ASIC), field programmable gate arrays (FPGA) or other programmable logic devices, etc. Some of the computing devices may store the software program internally.

The various embodiments of the invention may also be performed or embodied by a combination of computing devices and software programs providing the desired functionality stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method comprising:

by a monitoring probe of a passive non-intrusive monitoring system, monitoring data packets of a mirrored media stream transmitted from a first communication device to a second communication device in a packet-switched communications network, by the monitoring probe, determining media-related quality information for the mirrored media stream, based on the received data packets related to the mirrored media stream, by the monitoring probe, monitoring at least one Internet Control Message Protocol (ICMP) message transmitted from a network device in the packet-switched communications network, wherein the at least one ICMP message relates to the mirrored media stream and includes information on a transmission error of the data packets of the mirrored media stream to the second communication device, by the monitoring probe, determining ICMP-related quality information for the mirrored media stream, based on the received at least one ICMP message, related to the mirrored media stream, by the monitoring probe, monitoring a plurality of ICMP messages related to the mirrored media stream, including said at least one ICMP message, and by a pattern matching entity, deducing an error scenario based on the plurality of ICMP messages related to the mirrored media stream and based on different error scenario patterns stored in a pattern database of the monitoring probe, wherein determining the ICMP-related quality information includes adding information on the deduced error scenario to the ICMP-related quality information.

2. The method according to claim 1, wherein the ICMP-related quality information comprises at least one of the following: type and code values of the ICMP message identifying the kind of transmission error, and a timestamp of the transmission error.

3. The method according to claim 1, wherein the pattern database includes various sets of attributes respectively identifying the different error scenario patterns, said attributes of said sets relating to the data packets of the mirrored media stream and the plurality of ICMP messages, and wherein deducing the error scenario comprises:

by the pattern matching entity, determining attribute values based on the received data packets of the mirrored media stream and the plurality of ICMP messages, and
by the pattern matching entity, comparing the determined attribute values against attribute values of the included various sets of attributes respectively identifying different error scenario patterns included in the pattern database to identify the particular error scenario pattern that caused the plurality of ICMP messages to be generated.

4. The method according to claim 3, further comprising:
monitoring signaling messages, that are related to the mirrored media stream and are transmitted between the first and second communication devices,
correlating the signaling messages with the mirrored media stream, and
determining signaling-related quality information for the mirrored media stream based on the signaling messages;
wherein the attributes of said sets in the pattern database also relate to signalling messages.

5. The method according to claim 1, further comprising:
monitoring signaling messages, that are related to the mirrored media stream and are transmitted between the first and second communication devices,
correlating the signaling messages with the mirrored media stream, and
determining signaling-related quality information for the mirrored media stream based on the signaling messages.

6. The method according to claim 1, wherein the mirrored media stream belongs to a Voice over IP communication session identified by a session identifier, and the mirrored media stream is transmitted by using the Real-time Transport Protocol (RTP), the method further comprising the step of:
correlating the ICMP messages, including said at least one ICMP message, with the RTP data packets of the mirrored media stream based on the session identifier, included in the RTP data packets of the mirrored media stream and in the ICMP messages.

7. The method according to claim 1, wherein the mirrored media stream belongs to a Voice over IP communication session between the first and second communication devices, and wherein a call detail record is generated for the Voice Over IP communication session, the method further comprising:
adding the media-related quality information and the ICMP-related quality information to the call detail record of the Voice Over IP communication session.

8. The method according to claim 1, wherein the mirrored media stream belongs to a Voice over IP communication session between the first and second communication devices, and wherein at least one further mirrored media stream belongs to the Voice over IP communication session, the method further comprising the steps of:
monitoring data packets of the at least one further mirrored media stream, and
determining the media-related quality information also based on the data packets of the at least one further mirrored media stream.

9. A monitoring probe comprising:
a media monitoring unit to monitor, as part of a passive, non-intrusive monitoring system, data packets of a mirrored media stream transmitted from a first communication device to a second communication device in a packet-switched communications network,
a processor to determine media-related quality information for the mirrored media stream, based on the received data packets related to the mirrored media stream, and
an Internet Control Message Protocol (ICMP) monitoring unit to monitor at least one ICMP message transmitted from a network device, wherein the at least one ICMP message relates to the mirrored media stream and includes information on a transmission error of the data packets of the mirrored media stream to the second communication device,
the processor further determining ICMP-related quality information for the mirrored media stream, based on the received at least one ICMP message, related to the mirrored media stream,
wherein the media monitoring unit monitors a plurality of ICMP messages related to the mirrored media stream, including said at least one ICMP message, and
the monitoring probe comprises a pattern matching entity to deduce an error scenario based on the plurality of ICMP messages related to the mirrored media stream,
wherein the ICMP-related quality information further includes information on the error scenario that caused the ICMP message to be generated, and
further comprising a pattern database in a storage unit, the pattern database including various sets of attributes respectively identifying different error scenario patterns, the attributes of said sets relating to the data packets and the at least one ICMP message, and
the processor determines attribute values based on the received data packets of the mirrored media stream and the plurality of ICMP messages, and
the processor compares the determined attribute values against the attribute values of the included various sets of attributes respectively identifying different error scenario patterns included in the pattern database to identify the particular error scenario pattern that caused the ICMP message to be generated.

10. The monitoring probe according to claim 9, further comprising:
a signaling monitoring unit to monitor signaling messages, that are related to the mirrored media stream and are transmitted between the first and second communication devices,
a media/signaling correlation unit to correlate the signaling messages with the mirrored media stream, and
the processor to determine signaling-related quality information for the mirrored media stream based on the signaling messages.

11. The monitoring probe according to claim 9, wherein the mirrored media stream belongs to a Voice over IP communication session identified by a session identifier, and the mirrored media stream is transmitted by using the Real-Time Transport Protocol (RTP), the monitoring probe further comprising:
an ICMP/media correlation unit adapted to correlate the at least one ICMP message with the RTP data packets of the mirrored media stream based on the session identifier included in the RTP data packets of the mirrored media stream and the at least one ICMP message.

12. One or more non-transitory computer readable storage media storing instructions that when executed by a processor of a monitoring unit cause the monitoring unit, as part of a passive, non-intrusive monitoring system, to:
monitor data packets of a mirrored media stream transmitted from a first communication device to a second communication device in a packet-switched network, determine media-related quality information for the mirrored media stream, based on the received data packets related to the mirrored media stream, monitor at least one Internet Control Message Protocol (ICMP) message transmitted from a network device, wherein the at least one ICMP message relates to the mirrored media stream and includes information on a transmission error of the data packets of the mirrored media stream to the second communication device, determine ICMP-related quality information for the mirrored media stream, based on the received at least one ICMP message, related to the mirrored media stream, monitor a plurality of ICMP messages related to the mirrored media stream, including said at least one ICMP message, a pattern matching entity deducing an error scenario based on the plurality of ICMP messages related to the mirrored media stream and based on different error scenario patterns stored in a pattern database of the monitoring unit, the pattern database including various sets of attributes respectively identifying different error scenario patterns, the attributes of said sets relating to the data packets and the at least one ICMP message, wherein the ICMP-related quality information further includes information on the error scenario that caused the ICMP message to be generated, and determine attribute values based on the received data packets of the mirrored media stream and the plurality of ICMP messages, and compare the determined attribute values against the attribute values of the included various sets of attributes respectively identifying different error scenario patterns included in the pattern database to identify the particular error scenario pattern that caused the ICMP message to be generated.

* * * * *